(12) United States Patent
Sahashi et al.

(10) Patent No.: US 11,189,394 B2
(45) Date of Patent: Nov. 30, 2021

(54) ELECTRIC WIRE CONDUCTOR, COVERED ELECTRIC WIRE, WIRE HARNESS, AND METHOD FOR MANUFACTURING ELECTRIC WIRE CONDUCTOR

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Kyoma Sahashi, Yokkaichi (JP); Hayato Ooi, Yokkaichi (JP); Toyoki Furukawa, Yokkaichi (JP); Yasuyuki Otsuka, Yokkaichi (JP); Kinji Taguchi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, Osaka (JP)

( * ) Notice: Subject to any disclaimer, the term of this patent is extended or adjusted under 35 U.S.C. 154(b) by 0 days.

(21) Appl. No.: 16/977,635

(22) PCT Filed: Mar. 13, 2019

(86) PCT No.: PCT/JP2019/010248
§ 371 (c)(1),
(2) Date: Sep. 2, 2020

(87) PCT Pub. No.: WO2019/177016
PCT Pub. Date: Sep. 19, 2019

(65) Prior Publication Data
US 2021/0050128 A1   Feb. 18, 2021

(30) Foreign Application Priority Data

Mar. 14, 2018   (JP) .................... PCT/JP2018/009907

(51) Int. Cl.
*H01B 5/08*      (2006.01)
*H01B 7/282*     (2006.01)
(Continued)

(52) U.S. Cl.
CPC ............. *H01B 5/08* (2013.01); *H01B 7/0009* (2013.01); *H01B 7/0045* (2013.01); *H01B 7/282* (2013.01);
(Continued)

(58) Field of Classification Search
CPC ...... H01B 5/08; H01B 7/0009; H01B 7/0045; H01B 7/282; H01B 7/421; H01B 13/0207; H01B 13/0292; H01B 1/023
(Continued)

(56) References Cited

U.S. PATENT DOCUMENTS 5,260,516 A  *  11/1993  Blackmore .............. H01B 5/08
                                                174/113 A
9,522,640 B2     12/2016  Kanagawa
(Continued)

FOREIGN PATENT DOCUMENTS

JP   S63-158710 A   7/1988
JP   H05-159628 A   6/1993
(Continued)

OTHER PUBLICATIONS

May 1, 2018 International Search Report issued in International Patent Application No. PCT/JP2018/009907.
(Continued)

*Primary Examiner* — Timothy J Thompson
*Assistant Examiner* — Michael F McAllister
(74) *Attorney, Agent, or Firm* — Oliff PLC

(57) ABSTRACT

An electric wire conductor includes a wire strand having a plurality of elemental wires twisted together. The wire strand includes a deformed part in which a cross-section of the wire strand intersecting an axial direction of the wire strand is formed into a flat shape in which a width of the cross section
(Continued)

is larger than a height of the cross section, and an entire outer periphery of the cross section is formed as an outward curve. In the cross-section of the deformed part, the elemental wires have deformation ratios from a circle of 70% or lower at an outer peripheral part facing the outer periphery of the deformed part than at a center part located inside the outer peripheral part.

16 Claims, 12 Drawing Sheets

(51) Int. Cl.
*H01B 7/00* (2006.01)
*H01B 13/02* (2006.01)
*H01B 7/42* (2006.01)
*H01B 1/02* (2006.01)

(52) U.S. Cl.
CPC ......... *H01B 7/421* (2013.01); *H01B 13/0207* (2013.01); *H01B 13/0292* (2013.01); *H01B 1/023* (2013.01)

(58) Field of Classification Search
USPC ....................................................... 174/77 R
See application file for complete search history.

(56) References Cited

U.S. PATENT DOCUMENTS

| | | |
|---|---|---|
| 10,176,908 B2 | 1/2019 | Tanaka et al. |
| 2012/0261185 A1 | 10/2012 | Murao et al. |
| 2013/0068523 A1 | 3/2013 | Sato et al. |
| 2017/0110218 A1 | 4/2017 | Wakabayashi et al. |
| 2017/0309373 A1 | 10/2017 | Tanaka et al. |
| 2019/0259511 A1* | 8/2019 | Ooi .................. H01B 1/026 |

FOREIGN PATENT DOCUMENTS

| | | |
|---|---|---|
| JP | H05-62917 U | 8/1993 |
| JP | H08-249926 A | 9/1996 |
| JP | 2003-331671 A | 11/2003 |
| JP | 2006-260898 A | 9/2006 |
| JP | 2006-269201 A | 10/2006 |
| JP | 2011-134667 A | 7/2011 |
| JP | 2011-238508 A | 11/2011 |
| JP | 2016-054030 A | 4/2016 |
| JP | 2017-45523 A | 3/2017 |
| JP | 2017-79151 A | 4/2017 |
| WO | 2017/056278 A1 | 4/2017 |
| WO | 2018/088419 A1 | 5/2018 |

OTHER PUBLICATIONS

May 21, 2019 International Search Report issued in International Patent Application No. PCT/JP2019/010248.

U.S. Appl. No. 16/975,155, filed Aug. 24, 2020 in the name of Hayato Ooi et al.

Jun. 8, 2021 Office Action issued in Japanese Patent Application No. 2020-506601.

Sep. 21, 2021 Office Action issued in Japanese Patent Application No. 2020-506012.

Aug. 3, 2021 Office Action issued in Chinese Patent Application No. 201980016151.7.

* cited by examiner

ELECTRIC WIRE CONDUCTOR, COVERED ELECTRIC WIRE, WIRE HARNESS, AND METHOD FOR MANUFACTURING ELECTRIC WIRE CONDUCTOR

TECHNICAL FIELD

The present disclosure relates to an electric wire conductor, a covered electric wire, a wire harness, and a method for manufacturing an electric wire conductor.

BACKGROUND ART

In recent years, performance of an automobile has advanced, and the numbers of electric wires and parts installed in an automobile have been increasing. Meanwhile, in automobiles such as electric vehicles, the diameters of used electric wires are getting larger due to increase in the electric current to be applied.

Further, aluminum or an aluminum alloy is getting used as an electric wire conductor more frequently from the viewpoint of weight reduction of an electric wire. Since the electric conductivity of aluminum and an aluminum alloy, however, is lower than the electric conductivity of copper and a copper alloy, an electric wire containing an electric wire conductor made of aluminum or an aluminum alloy is required to have a conductor cross-sectional area larger than an electric wire containing an electric wire conductor made of copper or a copper alloy in order to secure necessary electric conduction, and thus the outer diameters of the electric wire conductor and a covered electric wire having an insulator on the outer periphery of the electric wire conductor increase undesirably.

Spaces where individual electric wires can be routed are decreasing because of the increase of electric wires and parts and increase of electric wire diameters, as stated above. Thus, it is required to route electric wires or wire harnesses efficiently while ensuring sufficient conductor cross-sectional areas. Electric wires constituting a wire harness generally have circular cross-sections. If the electric wires with circular cross-sections are bundled or arranged electric wires, large useless spaces will be generated.

In some cases, a plurality of electric wires may be bundled with a pipe or the like and used as a wire harness for the purpose of magnetic shield, prevention of interference with external substances. On this occasion, with the aim of reducing useless spaces in a pipe, Patent Literature 1 discloses single-core electric wire conductors having semicircular cross-sections, for example.

CITATION LIST

Patent Literature

Patent Literature 1: JP 2016-054030
Patent Literature 2: JP 2006-269201
Patent Literature 3: JP Hei 5-62917U
Patent Literature 4: JP 2017-45523
Patent Literature 5: JP 2006-260898
Patent Literature 6: JP Sho 63-153710
Patent Literature 7: JP 2011-134667
Patent Literature 8: WO 2017/056278
Patent Literature 9: Hei 8-249926

SUMMARY OF INVENTION

Technical Problem

In order to route electric wires efficiently, it is preferable to bend the electric wires flexibly and route the electric wires so that they may fit in a limited space. In the case of electric wire conductors consisting of single core conductors as disclosed in Patent Literature 1, however, individual electric wires are less flexible, and the degree of freedom in routing is low. In particular, electric wires with large conductor cross-sectional areas have problems in cable routing.

Flexibility can be improved when an electric wire conductor similar to those disclosed in Patent Literature 1 is configured as a wire strand containing a plurality of elemental wires. Conventionally, when such an electric wire conductor is manufactured, a processing method such as a drawing process where a force is applied to pull the electric wire conductor in an axial direction through a compression die has been used, for example. When such a processing method is used, however, a load is likely to be concentrated on elemental wires located on an outer peripheral part of the electric wire conductor, and a sharp protrusion structure (such as a burr) is likely to be formed on the outer peripheral part. Thus, it has been difficult to apply the processing method particularly to an electric wire conductor with a large conductor cross-sectional area and an electric wire conductor with many elemental wires constituting a wire strand.

The present disclosure has been made to solve the above problems, and an object of the present invention is to provide an electric wire conductor that is excellent in space saving and flexibility and is less likely to concentrate a load on specific elemental wires; and a covered electric wire and a wire harness that contains the electric wire conductor.

Solution to Problem

An electric wire conductor according to the present disclosure contains a wire strand containing a plurality of elemental wires twisted together. The wire strand contains a deformed part in which a cross-section of the wire strand intersecting an axial direction of the wire strand is formed into: a flat shape in which a width of the cross-section is larger than a height of the cross-section; or a sector shape comprising either a single edge or two edges touching each other at an apex and an outward curve connecting the ends of the single edge or the two edges. The elemental wires have, in the cross-section of deformed part, deformation ratios from a circle of 70% or lower at an outer peripheral part facing an outer periphery of the deformed part than at a center part located inside the outer peripheral part.

Advantageous Effects of Invention

An electric wire conductor according to the present disclosure contains not a single core conductor but a wire strand containing a plurality of elemental wires twisted together, and hence has high flexibility. Further, an electric wire conductor according to the present disclosure has a deformed part in which a cross-section of the wire strand is formed into a flat shape or a sector shape, and therefore, in a case of that a plurality of the covered electric wires containing the electric wire conductors are used in accumulation by being arranged or bundled, it is possible to accumulate the plurality of the covered electric wires with a small space between the plurality of covered electric wires, achieving excellent space saving. Furthermore, in the deformation of an electric wire conductor according to the present disclosure, the deformation ratios of the elemental wires from a circle at the outer peripheral part of the deformed part are 70% or lower of the deformation ratios of the elemental wires from a circle at the center part, the electric wire conductor can be formed and compressed sufficiently effectively while preventing concentration of a load on the elemental wires at the outer peripheral part and generation of wire breakage, material degradation, or an uneven structure such as a sharp protrusion at the outer peripheral part.

BRIEF DESCRIPTION OF DRAWINGS

FIG. 3A shows a case of a rectangular cross-section and FIG. 3B shows a case of an elliptic cross-section.

FIG. 4A shows a case of using covered electric wires containing electric wire conductors whose cross-sections are formed into a flat shape according to the first embodiment of the present disclosure; and FIG. 4B shows a case of using covered electric wires containing electric wire conductors whose cross-sections are formed into an elliptic shape according to the second embodiment of the present disclosure. In FIGS. 4A, 4B, 5A, 5B, and 6B, elemental wires are omitted.

FIGS. 5A and 5B are sectional views each showing wire harnesses using covered electric wires including electric wire conductors whose cross-sections are formed into an elliptic shape according to the second embodiment of the present disclosure, wherein the covered electric wires are accommodated in a connector housing in a state where a stopcock is placed at a terminal end. FIG. 5A shows a case of electric wire conductors having rectangular cross-sections and FIG. 5B shows a case of electric wire conductors having elliptic cross-sections.

FIG. 6B is a sectional view showing a state of placing such conventional covered electric wires in a housing member.

FIG. 9A shows a raw wire strand before compression, FIG. 9B shows Sample A1 compressed at a low compression rate, and FIG. 9C shows Sample A2 compressed at a high compression rate.

FIG. 10A shows a raw wire strand before compression, FIG. 10B shows Sample B1 compressed at a low compression rate, and FIG. 10C shows Sample B2 compressed at a high compression rate.

FIG. 11A shows a raw wire strand before compression, FIG. 11B shows Sample C1 compressed at a low compression rate, and FIG. 11C shows Sample C2 compressed at a high compression rate.

DESCRIPTION OF EMBODIMENTS

Figure 1:
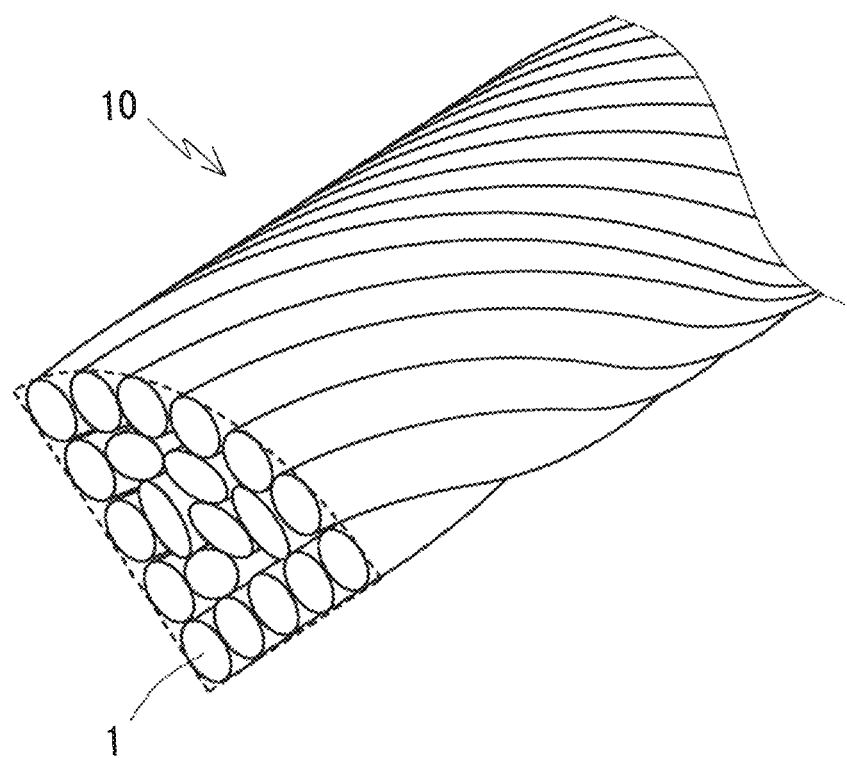
FIG. 1 is a perspective view showing an electric wire conductor whose cross-section is formed into a sector shape according to a first embodiment of the present disclosure.

Explanation of Embodiments According to Present Disclosure

First, embodiments according to the present disclosure are listed and explained.

An electric wire conductor according to the present disclosure contains a wire strand containing a plurality of elemental wires twisted together. The wire strand contains a deformed part in which a cross-section of the wire strand intersecting an axial direction of the wire strand is formed into: a flat shape in which a width of the cross-section is larger than a height of the cross-section; or a sector shape comprising either a single edge or two edges touching each other at an apex and an outward curve connecting the ends of the single edge or the two edges. The elemental wires have, in the cross-section of deformed part, deformation ratios from a circle of 70% or lower at an outer peripheral part facing an outer periphery of the deformed part than at a center part located inside the outer peripheral part.

An electric wire conductor according to the present disclosure contains not a single core conductor but a wire strand containing a plurality of elemental wires twisted together, and hence has high flexibility. Further, an electric wire conductor according to the present disclosure has a deformed part in which a cross-section of the wire strand is deformed from a circle. In the deformed part, a cross-section of the wire strand intersecting an axial direction of the wire strand is formed into: a flat shape in which a width of the cross-section is larger than a height of the cross-section; or a sector shape comprising either a single edge or two edges touching each other at an apex and an outward curve connecting the ends of the single edge or the two edges, and therefore, in a case of that a plurality of the covered electric wires containing the electric wire conductors are used in accumulation by being arranged or bundled, it is possible to accumulate the plurality of the covered electric wires with a small space between the plurality of covered electric wires, achieving excellent space saving. When the cross-section of a deformed part is formed into a flat shape, an aspect ratio of the flat shape is not particularly limited, and the cross-sectional shape of a deformed part can take various flat shapes including a rectangular shape, an elliptic shape, etc. When the cross-section of a deformed part is formed into a sector shape, the central angle of the sector shape is not particularly limited. When the central angle is 180 degrees, the shape is a semicircle having one side.

Further, an electric wire conductor according to the present disclosure, the deformation ratios of the elemental wires from a circle at the outer peripheral part of the deformed part are lower than that of the elemental wires from a circle at the center part. As a result, it is possible to form and compress the electric wire conductor sufficiently while suppressing concentration of the load on the elemental wires at the outer peripheral part and generation of material degradation, wire breakage or an uneven structure such as a sharp protrusion (i.e., aburr) at the outer peripheral part.

In particular, the deformation ratios of the elemental wires from a circle at the outer peripheral part of the deformed part are desirably 70% or lower of the deformation ratios of the elemental wires from a circle at the center part. As a result, the electric wire conductor can be formed and compressed sufficiently effectively while suppressing concentration of a load on the elemental wires at the outer peripheral part and generation of material degradation, wire breakage or an uneven structure such as a sharp protrusion at the outer peripheral part. More desirably, the deformation ratios of the elemental wires from a circle at the outer peripheral part of the deformed part are desirably 50% or lower of the deformation ratios of the elemental wires from a circle at the center part.

Here, in the cross-section of the deformed part stated above, a number ratio of the elemental wires having a circular cross-section is desirably 10% or higher and more desirably 15% or higher. By the presence of the elemental wires not deformed from a circle at the above proportion in the cross-section of the deformed part, a large load accompanying the deformation of the elemental wires is prevented from being applied to the electric wire conductor as a whole.

The deformation ratios of the elemental wires from a circle is desirably 15% or lower or more desirably 10% or lower at the outer peripheral part in the cross-section of the deformed part intersecting an axial direction. Consequently, the effects of preventing concentration of the load on the elemental wires at the outer peripheral part and generation of material degradation, wire breakage or an uneven structure such as a sharp protrusion at the outer peripheral part are obtained particularly effectively.

It is desirable that the electric wire conductor has a vacancy ratio, which is a ratio of a vacant space not occupied by the elemental wires in the deformed part intersecting an axial direction, of 10% or higher. Consequently, in the deformed part of the electric wire conductor, a particularly high flexibility is likely to be retained, and the degree of freedom of cable routing is improved.

It is desirable that the electric wire conductor has a continuous vacant space which can accommodate at least one of the elemental wires in the cross-section in the deformed part intersecting an axial direction. Consequently, the electric wire conductor can bend flexibly by utilizing movement of the elemental wires into the vacant space, and thus the effect of keeping the flexibility of the electric wire conductor high is particularly good.

It is desirable that the cross-section of the deformed part is formed into a flat shape and edges extending in the width direction are formed as outward curves. When an electric wire is formed by using an electric wire conductor having a cross-section in which edges extending in the width direction is formed as outward curves like an elliptic shape, the cross-section of the electric wire is formed into a flat shape, achieving excellent space saving. At the same time, since intimate contact with another electric wire or another object adjacent along the height direction can be avoided by the shape of the outward curve of the edges extending in the width direction, a high heat dissipation is likely to be secured. In this way, both space saving and heat dissipation are obtained.

When the number of elemental wires constituting the wire strand is 50 or larger, the wire strand is easy to be formed into a flat or sector-shaped cross-section by the change of the relative positions of the elemental wires even if the individual elemental wires are not significantly deformed. In the electric wire conductor therefore, both space saving and flexibility are likely to be ensured, and the elemental wires can be prevented from a damage such as breaking.

It is desirable that at least some of the elemental wires constituting the electric wire conductor comprise aluminum or an aluminum alloy. When elemental wires constituting the electric wire conductor comprise aluminum or an aluminum alloy, a conductor cross-sectional area tends to increase because of the low conductivity of aluminum; however, the effect of space saving can be obtained because a deformed part has a flat or sector-shaped cross-section.

A covered electric wire according to the present disclosure has the electric wire conductor and an insulator to cover the outer periphery of the electric wire conductor. The covered electric wire according to the present disclosure is excellent in space saving and has high flexibility because the covered electric wire has the electric wire conductor. Further, because the electric wire conductor is formed into a flat or sector-shaped cross-sectional shape, the unevenness of the electric wire conductor surface can be inhibited, the thickness of the insulator can be reduced, and, from the viewpoint of the thickness, space saving improves.

A wire harness according to the present disclosure includes the covered electric wire. The wire harness according to the present disclosure is excellent in space saving and has high flexibility because the wire harness has the covered electric wire. When the cross-section of the deformed part of the electric wire conductor is formed into a flat shape in particular, it is possible to keep gaps generated between respective covered electric wires small by arranging or stacking a plurality of covered electric wires. Further, it is possible to select the relative positions of the covered electric wires at a high degree of freedom in conformity with the shape, and the size of a vacant space in which the wire harness can be placed. It is therefore possible to obtain particularly high space saving. When the cross-section of the deformed part of the electric wire conductor is sector-shaped in contrast, high space saving is obtained by arranging a plurality of the covered electric wires, placed with the edges of the sector-shaped parts of the adjacent electric wire conductors facing each other, and when curved parts of a plurality of the covered electric wires are placed in a continuous manner, it is possible to obtain a bundle of the covered electric wires having a curved shape such as a circle at the outer periphery of the cross-section as a whole assembly of the covered electric wires.

Here, in the wire harness, it is desirable that: the wire harness includes a plurality of covered electric wires each having an electric wire conductor in which a cross-section of the deformed part is formed into the flat shape and edges extending in the width direction are formed as outward curves; and the covered electric wires are placed with the edges extending in the width direction facing each other via the insulators. On this occasion, the plurality of the covered electric wires each having a cross-section in which edges extending in the width direction are formed as outward curves are in the state of being arranged along the height direction. Consequently, excellent space saving is achieved by the flat cross-sectional shape, and parts not touching an adjacent covered electric wire occupy the major parts of the outer periphery of the covered electric wire due to outward curves of the edges extending in the width direction in the cross-section. As a result, high heat dissipation is obtained at parts between the covered electric wires.

On this occasion, it is desirable that the covered electric wires are arranged without a heat dissipation sheet placed between the covered electric wires. Since high heat dissipation is secured at places between the covered electric wires by the cross-sectional shapes of the covered electric wires as stated above, it is not necessary to place a heat dissipation sheet between the covered electric wires. It is therefore possible to reduce the number of members constituting a wire harness and simplify the structure of the wire harness.

It is desirable that: the covered electric wire has a deformed part at the end and has an electric wire conductor in which the cross-section of the deformed part is formed into the flat shape and edges extending in the width direction are formed as outward curves; and the covered electric wire is accommodated in a connector housing in the state where a stopcock is placed at the outer periphery of the end. The stopcock plays the role of inhibiting water from intruding into the connector housing from a part between the covered electric wire, and the connector housing. Because the electric wire conductor constituting the covered electric wire has outwardly-curved parts as the edges extending in the width direction in the cross-section, the stopcock can contact closely in a wide area to the outer periphery of the covered electric wire having a gentle outwardly-curved shape. As a result, high water stopping performance is exhibited between the covered electric wire, and the connector housing by the stopcock.

It is desirable that a wire harness includes a plurality of the covered electric wires in each of which the shape of the cross-section of the deformed part is a sector shape, and the covered electric wires are placed with the sides of the sector shapes facing each other via the insulator. Consequently, a substantially circular shape is formed by the combination of the covered electric wires, while the curved parts each connecting the ends of the edges are placed in a continuous manner. Thus, the covered electric wires are easy to fit in a pipe or the like and are excellent in space saving particularly.

On this occasion, it is desirable that a heat dissipation sheet is placed between the covered electric wires. When the covered electric wires are placed with the edges of the sector-shaped parts of the adjacent electric wire conductors facing each other as stated above, it is relatively hard to dissipate heat at the edges of the sector-shaped parts facing each other than at the curved parts exposed to the outside. By placing a heat dissipation sheet between the edges, however, it is possible to inhibit the influence of heat generation during application of electric current even when multiple covered electric wires are bundled with a pipe or the like. On this occasion, if the covered electric wires are bundled with a high heat conduction pipe made of aluminum for example, it is possible to dissipate heat efficiently from both the edges, and the curved parts of the sector-shaped parts.

A method for manufacturing an electric wire conductor according to the present disclosure, to manufacture the electric wire conductor, contains a compression step pressurizing a raw wire strand containing elemental wires twisted together with rollers from a first direction and a second direction which intersect an axial direction of the raw wire strand and oppose each other. In the method for manufacturing an electric wire conductor according to the present disclosure, force is applied from two directions intersecting an axial direction of a raw wire strand. Thus, it is possible to inhibit a load from concentrating on the elemental wires at the outer peripheral part in comparison, for example, with a conventional drawing process, whereby the electric wire conductor can be deformed while the deformation ratios of the elemental wires at the outer peripheral part are reduced. It is therefore possible to form the electric wire conductor into a sector shape while preventing wire breakage and formation of a burr caused by application of a large force only to the elemental wires at the outer peripheral part, whereby the electric wire conductor achieve excellent space saving.

If at least one of the rollers has a grove part touching a raw wire strand at least at a part of the groove part in a circumferential direction, and notches to prevent elemental wires constituting the raw wire strand from being caught are formed at the ends of the groove part, clearances that can accommodate the elemental wires are formed at gaps formed by the groove part of the opposing rollers. The clearances can make the elemental wires constituting the raw wire strand hard to be caught between the rollers, and can prevent wire breakage and formation of a burr due to the catching of the elemental wires.

Details of Embodiments According to Present Disclosure

Embodiments according to the present disclosure are hereunder explained in detail in reference to drawings.

In the present description, a shape such as a circle, a sector shape, a rectangle, an ellipse, aside, a straight line, an arc, or the like: is not limited to the geometrical meaning; includes a deviation caused by a material, a manufacturing process, or the like; and is acceptable as long as the deviation is the extent of being recognizable as a circle, a sector shape, a rectangle, an ellipse, a side, a straight line, an arc, or the like. Further, a cross-sectional shape of an electric wire conductor or a covered electric wire such as a sector shape, a rectangle, or an ellipse can be recognized on the basis of the shape of a circumscribed figure in a cross-section. In the present description, across-section of an electric wire conductor or a covered electric wire refers to a cross-section that vertically intersects an axial direction of the electric wire conductor or the covered electric wire. Furthermore, a conductor cross-sectional area refers to a nominal cross-sectional area.

<Electric Wire Conductor>

An electric wire conductor according to an embodiment of the present disclosure is comprised of a wire strand comprising a plurality of elemental wires 1 twisted together. An electric wire conductor according to an embodiment of the present disclosure has a deformed part that occupies at least a partial region along an axial direction (longitudinal direction) and has a cross-section intersecting the axial direction whose shape is deformed from a circle. Two embodiments having different cross-sectional shapes of the deformed parts are explained hereunder. In a first embodiment, the cross-sectional shape of a deformed part is sector-shaped and, in a second embodiment, the cross-sectional shape of a deformed part is flat. In the following, in either of the embodiments, a case where the whole area of the electric wire conductor is occupied by a deformed part is shown.

(Cross-Sectional Shape of Electric Wire Conductor)

(1) First Embodiment

Figure 2:
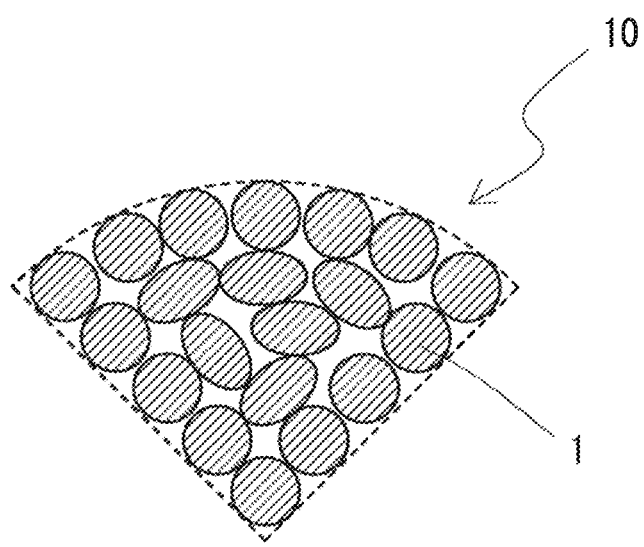
FIG. 2 is a sectional view showing the electric wire conductor stated above.

An external appearance of an electric wire conductor 10 according to a first embodiment of the present disclosure is shown in a perspective view of FIG. 1. Further, a cross-section perpendicular to an axial direction of the electric wire conductor 10 is shown in FIG. 2. In FIGS. 1 and 2 and FIGS. 3A and 3B that will be explained later, elemental wires 1 constituting the electric wire conductor 10 or 10A are shown with a reduced number for ease of understanding.

In an electric wire conductor 10 according to the first embodiment of the present disclosure, a cross-section intersecting an axial direction is sector-shaped. That is, a cross-section intersecting an axial direction has a sector shape having one side or two sides touching each other at an apex and an outward curve connecting the ends of the single side or the two sides. In the case of only one side, the sector shape takes a semicircle.

Figure 4A:
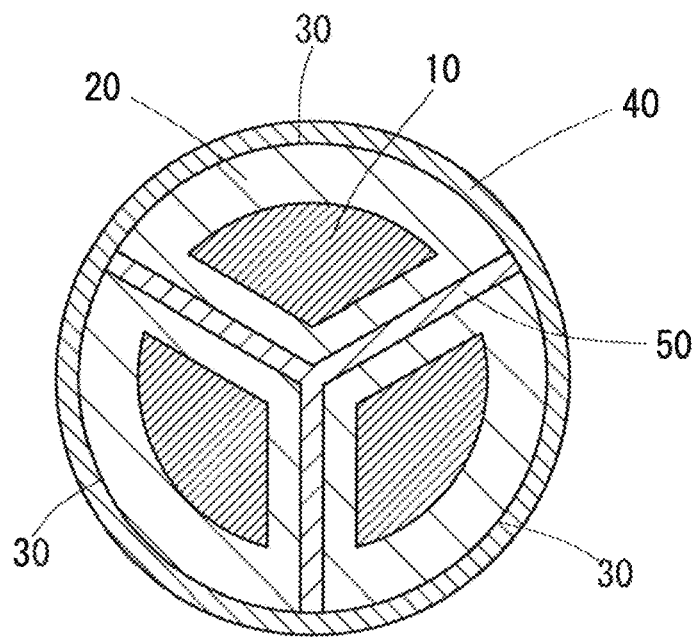
FIGS. 4A and 4B are sectional views showing states of placing covered electric wires in housing members.

A central angle of a sector shape in a cross-section of an electric wire conductor 10 is not particularly limited. Here, when the central angle is 180 degrees, a semicircle having a single side is formed. A central angle may be decided appropriately in accordance with a form of routing an electric wire having an electric wire conductor 10. For example, when three electric wires having the same thickness are routed together as shown in FIG. 4A that will be explained later, the central angles of all the electric wires may be set to about 120 degrees and, when a plurality of electric wires having different thicknesses are routed together, the central angles may be changed in accordance with the respective thicknesses.

(2) Second Embodiment

Figure 3A:
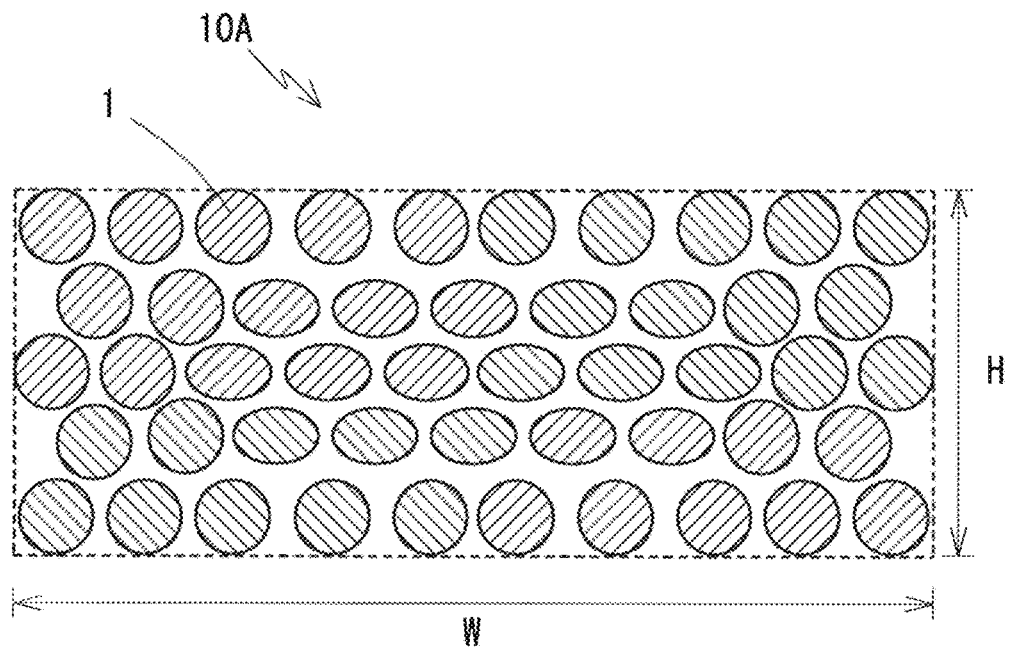
FIGS. 3A and 3B are sectional views showing electric wire conductors according to a second embodiment of the present disclosure whose cross-sections are formed into a flat shape.
Figure 3B:
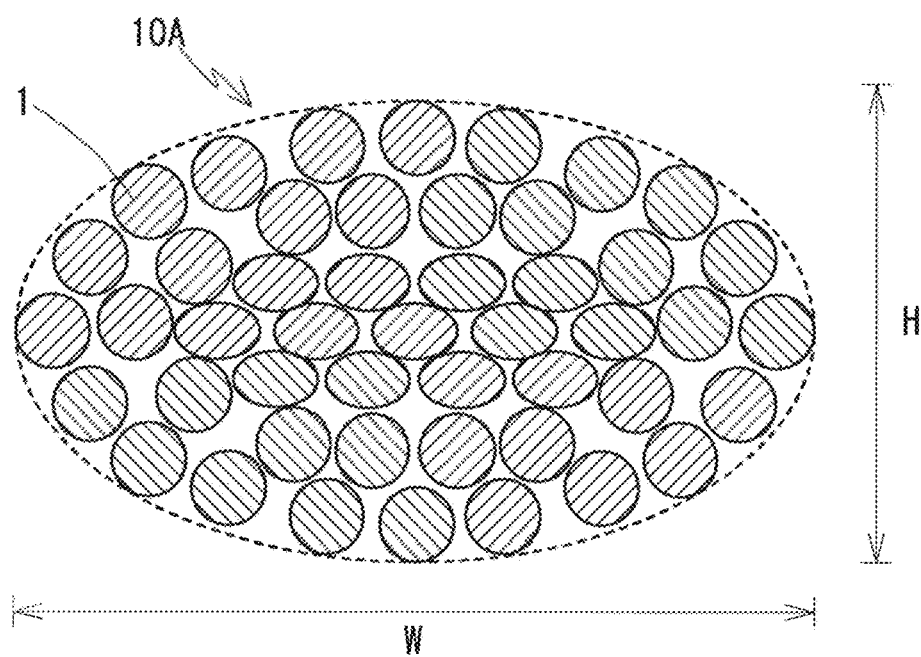

Cross-sections perpendicular to axial directions of electric wire conductors 10A according to the second embodiment of the present disclosure are shown in FIGS. 3A and 3B. FIGS. 3A and 3B show examples of different cross-sectional shapes.

In an electric wire conductor 10A according to the second embodiment of the present disclosure, a cross-section intersecting an axial direction is flat. That is, a width W of a cross-section intersecting an axial direction is larger than a height H. Here, a width W of a cross-section is: when a cross-section has a straight side on an outer edge like FIG. 3A, the length of the longest straight line in the straight lines that transverse the cross-section in parallel with the side and include the whole cross-section in the range; and, when a cross-section does not have a straight side on an outer edge like FIG. 3B, the length of the longest straight line in the straight lines that transverse the cross-section and include the whole cross-section in the range. A height H of a cross-section is the length of a straight line that is perpendicular to the straight line defining a width W and includes the whole cross-section in the range.

The cross-section of an electric wire conductor 10A may take any concrete shape as long as it is flat. As specific examples, a case where the cross-section is rectangular is shown in FIG. 3A and a case where the cross-section is elliptic is shown in FIG. 3B. In either of the cases, a width W is larger than a height H. As other flat shapes, an oblong shape (a shape having semicircles on both ends of a rectangle) and a quadrangle other than a rectangle such as a trapezoid or a parallelogram can be named. Further, an aspect ratio of a flat shape is also not particularly limited and a form where a ratio of height H:width W is about 1:2 to 1:8 can be exemplified. In particular, an aspect ratio is desirably about 1:3 to 1:5. Consequently, it becomes easy to avoid excessive deformation and application of load to elemental wires 1 due to significant flattening while the cross-sectional shape of the electric wire conductor 10A is sufficiently flattened.

(Shape of Elemental Wires in Cross-Section)

In an electric wire conductor 10 according to the first embodiment and an electric wire conductor 10A according to the second embodiment of the present disclosure, a deformation ratio of elemental wires 1 at an outer peripheral part facing an outer periphery of the electric wire conductor 10 or 10A is not higher than a deformation ratio of elemental wires 1 at a center part located inside the outer peripheral part in a cross-section perpendicular to an axial direction. Further, a deformation ratio of elemental wires 1 at an outer peripheral part is lower than a deformation ratio of elemental wires 1 at a center part. The forms where a deformation ratio of elemental wires 1 is not higher than a deformation ratio of elemental wires 1 at a center part are schematically shown in FIGS. 1, 2, 3A, and 3B.

Here, the deformation ratio of an elemental wire 1 is an index showing how much the cross-section of a certain elemental wire 1 deviates from a circle. For an elemental wire 1 actually contained in the electric wire conductor 10 or 10A, when a length of the longest straight line laterally crossing a cross-section is defined as a long diameter A and a diameter of a circle having the same area as the cross-sectional area of the elemental wire 1 is defined as a circle diameter R, a deformation ratio D of the elemental wire 1 can be represented as follows:

$$D=(A-R)/R\times 100\% \quad (1).$$

The circle diameter R may be calculated by measuring an actual cross-sectional area of the elemental wire 1 or a diameter of an elemental wire 1 not deformed may be adopted as a circle diameter R when the diameter of the elemental wire 1 before deformed is known or when apart where the elemental wire 1 is not deformed coexists in an axial direction of the electric wire conductor 10 or 10A. Otherwise, it is also possible to adopt only an elemental wire 1 placed at the outermost periphery of an electric wire conductor 10 or 10A as an elemental wire 1 at an outer peripheral part and only an elemental wire 1 placed in the center of the conductor as an elemental wire 1 at a center part but, from the viewpoint of reducing the influence of variation in deformation of the elemental wires 1 and the like, it is desirable to estimate a deformation ratio as an average value of a plurality of elemental wires 1 included in a region over a certain area.

When a deformation ratio of elemental wires 1 at an outer peripheral part is not higher than a deformation ratio of elemental wires 1 at a center part or moreover is lower than a deformation ratio of an elemental wire 1 at a center part, an electric wire conductor 10 or 10A can be deformed and compressed sufficiently while a load is prevented from concentrating on the elemental wire 1 at the outer peripheral part, the modification of a material or wire breakage is prevented from being generated, and an uneven structure (burr) such as a sharp protrusion is prevented from forming at the outer peripheral part. When an electric wire conductor 10 or 10A according to the present embodiment is manufactured by deforming a conventional general electric wire conductor 10' having a substantially circular cross-section by compression or the like in particular, it is possible to inhibit a load from concentrating on the elemental wires 1 at the outer peripheral part by force applied for the compression.

In an electric wire conductor 10 or 10A according to an embodiment of the present disclosure, not only a deformation ratio of elemental wires 1 at an outer peripheral part is not higher than a deformation ratio of elemental wires 1 at a center part in a cross-section but also a deformation ratio of elemental wires 1 at an outer peripheral part is 70% or lower of a deformation ratio of elemental wires 1 at a center part in a cross-section. Because a deformation ratio of elemental wires 1 at an outer peripheral part is 70% or lower of a deformation ratio of elemental wires 1 at a center part in a cross-section, the effect of deforming and compressing the electric wire conductor 10 or 10A sufficiently is more likely to be obtained even when specific cross-sectional shapes and cross-sectional dimensions are diverse while a load is prevented from concentrating on the elemental wires 1 at the outer peripheral part, the modification of a material or wire breakage is prevented from being generated, and an uneven structure (burr) such as a sharp protrusion is prevented from forming at the outer peripheral part. A deformation ratio of elemental wires 1 at an outer peripheral part is more desirably 50% or lower, yet more desirably 20% or lower, and particularly desirably 10% or lower of a deformation ratio of elemental wires 1 at a center part in a cross-section.

Further, a deformation ratio of elemental wires 1 from a circle at an outer peripheral part is desirably 15% or lower, more desirably 10% or lower, and yet more desirably 5% or lower in a cross-section. When a deformation ratio of elemental wires 1 at an outer peripheral part is 15% or lower in a cross-section, the effects of preventing a load from concentrating on the elemental wire 1 at the outer peripheral part, the modification of a material or wire breakage from being generated, and an uneven structure such as a sharp protrusion from forming at the outer peripheral part are obtained particularly effectively.

In an electric wire conductor 10 having a sector-shaped cross-section according to the first embodiment, an outer peripheral part can be categorized into the four parts comprising side parts, a curved part, corner parts where the side parts and the curved part touch each other, and an apex part where the side parts touch each other of a fan shape. It is desirable that the magnitudes of the deformation ratios of elemental wires 1 at the four parts have roughly the following relationship; side parts>curved part>corner parts>apex part. It is desirable that deformation ratios of elemental wires 1 at least at the corner parts, and the apex part in the above four parts at the outer peripheral part are not higher than a deformation ratio of elemental wires 1 at a center part and further 70% or lower of a deformation ratio of elemental wires 1 at a center part. This is to prevent elemental wires 1 from being significantly deformed at the apex part, and the corner parts of the sector shape for the purpose of making a cross-sectional shape close to an ideal sector shape or the like when the cross-sectional shape is formed into a sector shape in an electric wire conductor 10.

On the other hand, in an electric wire conductor 10A having a flat cross-section according to the second embodiment, an outer peripheral part can be categorized into two parts comprising ends and middle parts of a flat shape. The ends: are parts at both the ends in the width direction (direction of width W) of the flat shape in a cross-section; and refer to both the ends of the sides in the width direction in the case of a rectangular cross-section like FIG. 3A. The ends refer to both the ends in the long axis direction in the case of an elliptic cross-section like FIG. 3B. The middle parts refer to parts excluding the ends from the edges of the flat shape extending in the width direction, namely the middle regions of the edges extending in the width direction. It is desirable that a deformation ratio of elemental wires 1 at an outer peripheral part of a flat shape has the following relationship; middle parts>ends. It is desirable that a deformation ratio of elemental wires 1 at least at the ends in the two parts at an outer peripheral part is not higher than a deformation ratio of elemental wires 1 at a center part and further 70% or lower of a deformation ratio of elemental wires 1 at a center part. This is to prevent elemental wires 1 from being significantly deformed at the ends of the flat shape for the purpose of making a cross-sectional shape close to an ideal rectangular shape or the like when the cross-sectional shape is formed into a flat shape in an electric wire conductor 10A.

In an electric wire conductor 10 or 10A according to the present embodiment, as long as a cross-section is a sector shape or a flat shape as the external shape of the whole electric wire conductor 10 or 10A, the cross-sectional shapes of individual elemental wires 1 constituting the electric wire conductor 10 or 10A may be any shapes. A general metallic elemental wire has a substantially circular cross-section and such an elemental wire 1 can be applied also in the present embodiment. It is desirable that at least some of elemental wires 1 in an electric wire conductor 10 or 10A may not be deformed and may remain in the state of a substantially circle when the whole shape of the electric wire conductor 10 or 10A is formed into a sector shape or a flat shape. In an electric wire conductor 10 or 10A according to the present embodiment, elemental wires 1 not deformed are likely to remain particularly at an outer peripheral part.

Further, it is desirable that a number ratio of elemental wires 1 having a circular cross-section (circular elemental wire proportion) is 5% or more in a cross-section of an electric wire conductor 10 or 10A. Here, an elemental wire 1 having a circular cross-section is an elemental wire 1 having a deformation ratio defined by the expression (1) of 5% or lower and a circular elemental wire proportion is estimated as a ratio of the number of elemental wires 1 having a circular cross-section to the total number of the elemental wires 1 in a cross-section (number of elemental wires having circular cross-section/total number of elemental wires×100%). A higher circular elemental wire proportion means that elemental wires 1 not deformed from a circle occupy the majority in a cross-section of an electric wire conductor 10 or 10A and a load applied to respective elemental wires 1 by deformation is small in the whole cross-section. In other words, it means that modification or wire breakage of elemental wires 1 caused by the application of load is hardly generated. By a circular elemental wire proportion of not lower than 5%, it is possible to effectively inhibit modification or wire breakage caused by the deformation of elemental wires 1 from being generated. From the viewpoint of further enhancing those effects, a circular elemental wire proportion is more desirably 10% or higher, 15% or higher, 20% or higher, or 40% or higher. From the viewpoint of sufficiently forming the cross-sectional shape of a whole electric wire conductor 10 or 10A into a sector-shaped or flat shape on the other hand, a circular elemental wire proportion is desirably 80% or lower or 70% or lower.

(Features other than Elemental Wire Shape)

As stated above, an electric wire conductor 10 or 10A according to the present embodiment comprises a wire strand formed by twisting a plurality of elemental wires 1 together. As a result, the electric wire conductor 10 or 10A has higher flexibility than a single core conductor of the same conductor cross-sectional area.

An elemental wire 1 constituting an electric wire conductor 10 or 10A may comprise any conductive material including a metallic material. As representative materials constituting an elemental wire 1, copper and a copper alloy and aluminum and an aluminum alloy can be named. Those metallic materials are suitable for constructing an electric wire conductor 10 or 10A according to the present embodiment on the points of being easy to form a desired shape by deformation and maintain a once formed shape firmly when a wire strand is formed. Aluminum or an aluminum alloy is desirable from the viewpoints of weight reduction and cost reduction of an electric wire conductor 10 or 10A, significance of reducing a conductor diameter by compression, and others. As elemental wires 1 constituting an electric wire conductor 10 or 10A, either all elemental wires comprising the same material may be used or several kinds of elemental wires 1 comprising different materials may be mixed and used. When an electric wire conductor 10 or 10A comprises several kinds of elemental wires 1 comprising different materials, the deformation ratios at an outer peripheral part and a center part may desirably be compared by average values of deformation ratios of elemental wires 1 comprising the same material or several kinds of elemental wires 1.

A conductor cross-sectional area of an electric wire conductor 10 or 10A may be selected arbitrarily in accordance with a desired resistance value and the like and, as a desired range of the conductor cross-sectional area of the electric wire conductor 10 or 10A, 3 mm$^2$ or larger can be exemplified. The range is more desirably 50 mm$^2$ or larger. When a conductor cross-sectional area is 3 mm$^2$ or larger, the effect of space saving caused by an electric wire conductor 10 or 10A of a sector-shaped or flat cross-section is large. Further, on those occasions, as a desirable diameter of an elemental wire 1 constituting an electric wire conductor 10 or 10A, 0.3 to 1.0 mm can be exemplified.

In a cross-section of an electric wire conductor 10 or 10A, it is desirable that a vacancy ratio, which is a proportion of a vacant space not occupied by elemental wires 1, is 10% or higher or further 15% or higher. Consequently, the elemental wires 1 can take various relative positions by using the vacant space among the elemental wires 1 and hence, even when the shapes of the individual elemental wires 1 themselves are not significantly deformed, the cross-section of the electric wire conductor 10 or 10A can be formed easily into a desired shape by using the relative positions of the elemental wires 1. The upper limit of a vacancy ratio is not particularly limited but, from the viewpoints of easily forming a sector-shaped or flat shape, easily retaining the formed sector-shaped or flat shape, and the like, a vacancy ratio is desirably 30% or lower.

The vacancy ratio is a proportion of a total area of vacant spaces of various sizes and shapes to a cross-sectional area of an electric wire conductor 10 or 10A and, when the total area of the vacant spaces is within a predetermined range in the cross-section of the electric wire conductor 10 or 10A, the flexibility of the electric wire conductor 10 or 10A is enhanced and, in addition to that, the existence of vacant spaces with certain sizes as a continuous region is effective for improving the flexibility of the electric wire conductor 10 or 10A. Specifically, it is desirable to have a continuous vacant space that can accommodate one or more elemental wires 1, or even two or more elemental wires 1, in a cross-section of an electric wire conductor 10 or 10A. This is because the elemental wires 1 move in such a large vacant space and that assists the flexible bending of the electric wire. Here, as an elemental wire 1 to judge whether or not it can be accommodated in a space, it is possible to assume and use: an elemental wire 1 surrounding an intended vacant space; or an elemental wire of a circular cross-section having a cross-sectional area similar to an arbitrary elemental wire 1 constituting an electric wire conductor 10 or 10A.

Figure 6A:
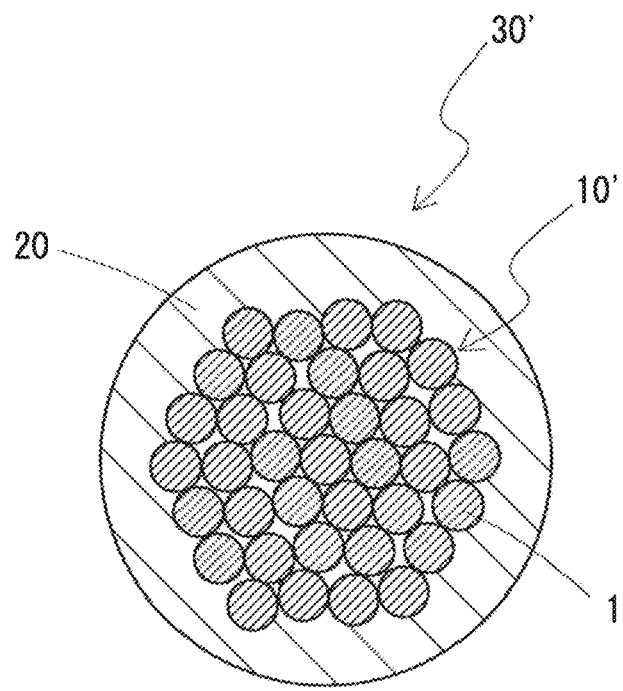
FIG. 6A is a sectional view of a conventional covered electric wire in which an electric wire conductor is not compressed.

In general, when compression processing is not applied to a wire strand conductor, in a wire strand 10' comprising a small number of elemental wires 1 in particular, unevenness is gene rated on the outer periphery of the wire strand as shown in FIG. 6A. When the wire strand is covered with an insulator 20, the thickness of the insulator 20 is required to be secured sufficiently so that characteristics such as wear resistance, etc. may be satisfied even at a part where the thickness of the insulator 20 is smallest. It is possible to: reduce unevenness at the outer periphery of a wire strand by forming an electric wire conductor 10 or 10A into a sector-shaped or flat shape through compression processing; reduce the thickness of the insulator 20 as an average over the entire periphery by forming the insulator 20 of a uniform thickness capable of satisfying the characteristics over the entire periphery; and be excellent in space saving.

Further, because an electric wire conductor 10 or 10A has a sector-shaped or flat cross-sectional shape, a covered electric wire 30 formed by covering the outer periphery of the electric wire conductor 10 or 10A with an insulator 20 also takes a cross-sectional shape that can be regarded as a sector-shaped or flat shape. As it will be explained in the section of a wire harness later in detail, it is possible to integrate a plurality of covered electric wires 30 at a high density by using such across-sectional shape. That is, it is possible to reduce gaps generated among the covered electric wires 30 and integrate the covered electric wires 30 when the multiple covered electric wires 30 are bundled, arranged, and integrated. Further, by selecting the mutual positioning of the covered electric wires 30 in conformity with the size and shape of a vacant space where the covered electric wires 30 are to be routed, it is possible to route the covered electric wires 30 into various vacant spaces.

As stated above, an electric wire conductor 10 or 10A according to the present embodiment has both space saving and flexibility and has a high degree of freedom in cable routing. In an automobile for example, the numbers of installed wires and parts are increasing due to high functionality in recent years. Further, in an electric vehicle and the like, electric current increases and hence the diameter of each electric wire is also increasing. As a result, spaces where individual electric wires can be routed are reducing. By using an electric wire conductor 10 or 10A according to the present disclosure, space saving and flexibility are excellent, and hence it is possible to route an electric wire by using a small space effectively. The effect increases particularly in the case of accumulating many electric wires or using an electric wire having a large conductor cross-sectional area.

<Figuration of Electric Wire Conductor>

Figure 7:
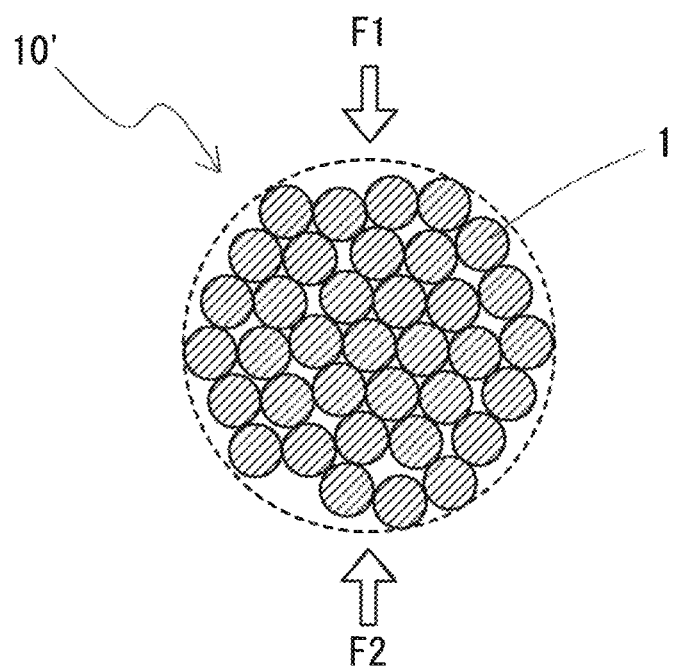
FIG. 7 is a sectional view explaining compression of a raw wire strand.

A manufacturing method of an electric wire conductor 10 or 10A according to the present embodiment is not particularly limited and for example the electric wire conductor 10 or 10A can be formed by compressing a raw wire strand 10' formed by twisting a plurality of elemental wires 1 together as shown in FIG. 7. On this occasion, forces F1 and F2 are applied from a first direction and a second direction that are perpendicular to an axial direction of the raw wire strand 10' and face each other. If necessary, forces F3 and F4 (not shown in the figure) may be applied additionally to the raw wire strand 10' from a third direction and a fourth direction that intersect the first direction and the second direction and face each other. It is possible to deform the raw wire strand 10' efficiently by applying forces at least from opposing two directions. Further, it is possible to form a deformed electric wire conductor 10 or 10A by applying forces from different directions in multiple steps while pressure is prevented from being biased toward the elemental wires 1 at an outer peripheral part of the raw wire strand 10', material degradation or wire breakage is prevented from being generated in the elemental wires 1 at the outer peripheral part, and a burr is prevented from forming.

When an electric wire conductor 10A of a flat cross-section is manufactured in particular, it is desirable to apply the forces F3 and F4 to a raw wire strand 10' from the third and fourth directions that intersect the first and second directions and face each other in addition to the forces F1 and F2 from the first and second directions. Moreover, it is desirable to: apply the forces F1 and F2 at first; successively apply forces F1' and F2' from the same directions again; and simultaneously apply the forces F3 and F4. Consequently, an obtained electric wire conductor 10A becomes easy to be formed into a rectangular cross-sectional shape. On this occasion, the parts to which the forces F1, F2, F1', and F2' are applied are long sides along the width direction of the rectangle.

Figure 8A:
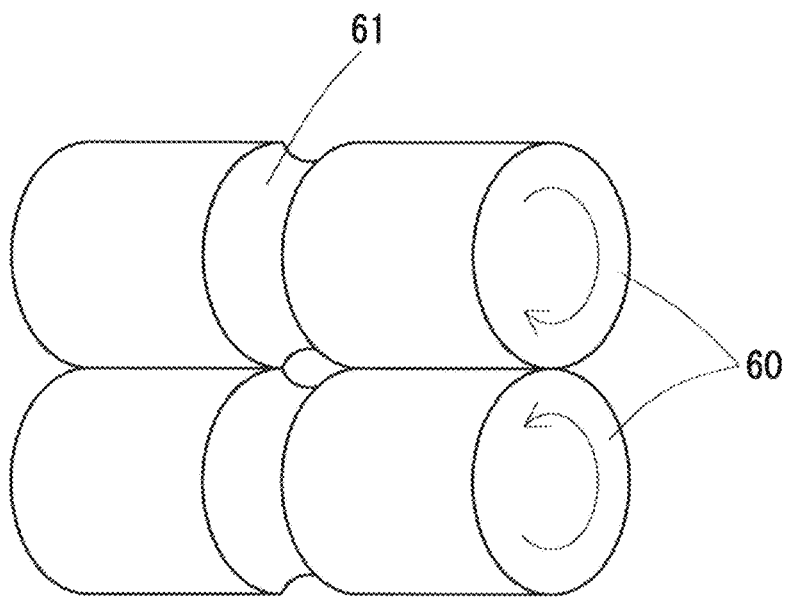
FIG. 8A is a perspective view of rollers to deform an electric wire conductor and FIG. 8B is an enlarged view of a part where the rollers touch the electric wire conductor when the electric wire conductor is formed into a sector-shaped cross-section.
Figure 8B:
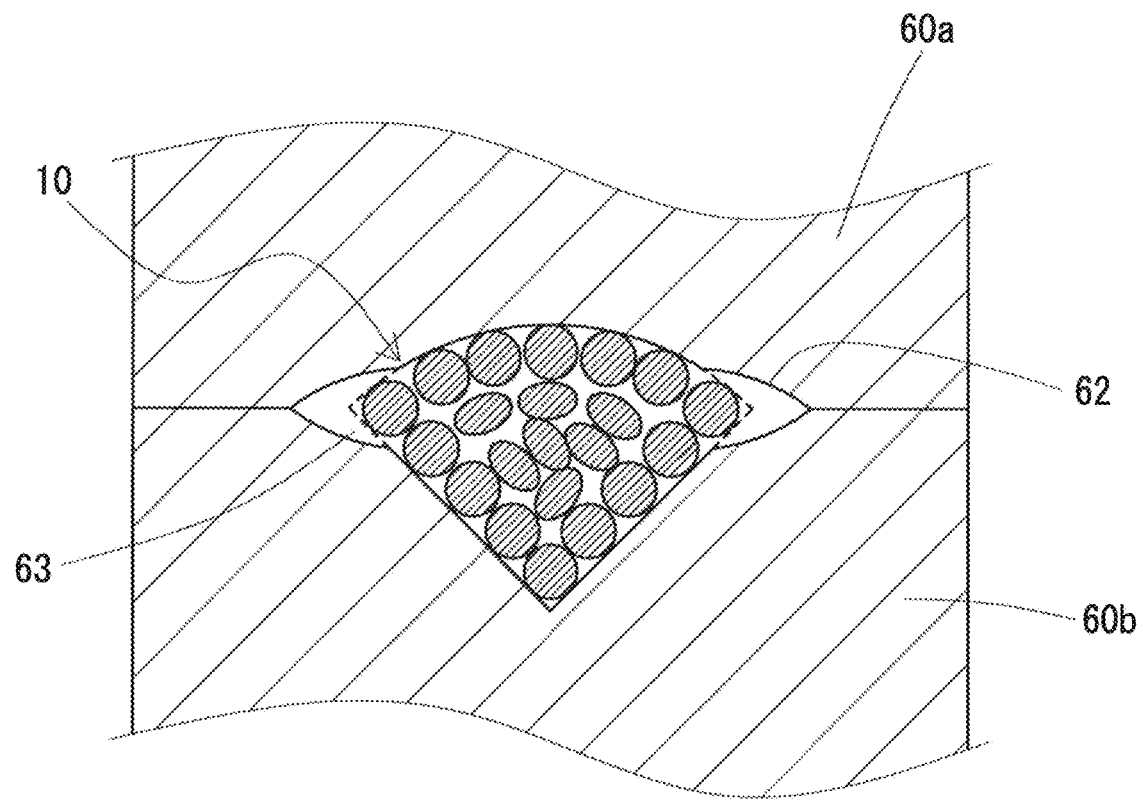

Force may be applied to a raw wire strand 10' by installing rollers 60 facing each other and passing the raw wire strand 10' between the rollers 60 as shown in FIGS. 8A and 8B, for example. When the rollers 60 are used, force can be applied to the raw wire strand 10' while the paired rollers 60 facing each other rotate in opposite directions, and the raw wire strand 10' is sent out by the rotation of the rollers 60. On this occasion, the force can be applied to the raw wire strand 10' from the outside toward the inside in the radial direction without applying force to pull the raw wire strand 10' in an axial direction like the case of compressing the raw wire strand 10' with a die. Further, since the rollers are wide open on the front side of the transport direction of the raw wire strand 10', a large force is not applied, and the force applied toward the contact point of the two rollers 60 increases gradually. As a result, the applied force spreads throughout the raw wire strand 10' and it is possible to prevent a load from concentrating on the outer peripheral part. Further, when the rollers 60 are used, a long raw wire strand 10' can be processed continuously while being fed, and productivity improves.

Each of the rollers 60 has a groove part 61 in the circumferential direction, and the groove part 61 touches a raw wire strand 10' at least at a part of the groove part 61. The cross-sectional shape of an electric wire conductor 10 or 10A compressed by the rollers 60 reflects the shape of the groove part 61 touching the raw wire strand 10'. As shown in FIG. 8B for example, an electric wire conductor 10 having a sector-shaped cross-section can be obtained by forming an arc-shaped groove part in a roller 60a of the paired rollers and forming a V-shaped groove part in the other roller 60b. When an electric wire conductor 10A of a flat cross-section is manufactured, the groove 61 formed in the roller should have a shape corresponding to a desired flat shape.

It is desirable to form notches 62 to prevent elemental wires 1 from being caught between the rollers at the ends of the groove part 61 where the rollers 60 face each other. Specifically, as shown in FIG. 8B, a structure of inclining so as to be separated from the raw wire strand 10' in an axial direction of the rollers 60 can be exemplified. When the raw wire strand 10' is compressed, it sometimes happens that a protrusively sharply deformed burr is formed or a caught elemental wire 1 breaks when some of the constituent elemental wires 1 are caught between the rollers but, if the notches 62 are formed at the ends of the groove part 61, gaps formed by the groove part 61 of the opposing rollers 60 form clearances 63 that can accommodate the elemental wires 1 so as not to be caught, and the elemental wires 1 become less likely to be caught. As a result, the generation of a burr or wire breakage caused by being caught can be prevented.

As stated above, by applying forces F1 and F2 with rollers from a first direction and a second direction that are perpendicular to an axial direction of a raw wire strand 10' and face each other, it is possible to manufacture an electric wire conductor 10 or 10A having a deformation ratio at an outer peripheral part not higher than a deformation ratio at a center part. Conventionally, when an electric wire conductor 10' comprising a wire strand of a substantially circular cross-section is deformed, a processing method such as a drawing process of applying force to pull the electric wire conductor 10' in an axial direction with a compression die or the like has been used. In such a processing method, however, a load has been likely to concentrate on elemental wires 1 at an outer peripheral part, and the deformation ratio of the elemental wires 1 at the outer peripheral part has tended to increase. As a result, when an electric wire conductor 10' with a large conductor cross-sectional area or an electric wire conductor 10' having many elemental wires 1 constituting a wire strand is deformed in particular, a large pulling force has been required, a burr or wire breakage has been likely to be generated, and manufacturing has been difficult. A manufacturing method according to the present embodiment is suitable particularly for the case of a large cross-sectional area or many elemental wires 1 constituting a wire strand that has heretofore been difficult to be manufactured.

<Covered Electric Wire>

A covered electric wire 30 according to an embodiment of the present disclosure has an electric wire conductor 10 or an electric wire conductor 10A according to an embodiment of the present disclosure as stated above and an insulator 20 covering the outer periphery of the electric wire conductor 10 or 10A. Although it has also been explained above, the whole cross-sectional shape of the covered electric wire 30 including the insulator 20 is also regarded as a sector-shaped or flat shape similarly to the cross-sectional shape of an electric wire conductor 10 or 10A by reflecting the cross-sectional shape of the electric wire conductor 10 or 10A.

A material of the insulator 20 is not specifically limited, and the insulator 20 can comprise various polymeric materials. Further, a polymeric material may contain a filler or an additive as appropriate. The material and thickness of the insulator 20 may be selected as appropriate in accordance with desired characteristics such as wear resistance, flexibility, etc. of the insulator 20. From the viewpoints of space saving, flexibility, etc., the thickness of the insulator 20 should not be excessively thick. For example, an insulator 20 having an average thickness of 2.0 mm or less can be exemplified as a desirable insulator.

By forming the cross-section of an electric wire conductor 10 or 10A into a sector-shaped or flat shape, it is possible to reduce unevenness of an outer peripheral part and reduce and equalize the thickness of an insulator 20. As a result, it is possible to reduce the excessive thickness of the insulator 20 and improve space saving.

It is desirable that an insulator 20 takes a form of integrally surrounding the entire periphery of an electric wire conductor 10 or 10A. On this occasion, the insulator 20 can be formed by applying a polymeric material constituting the insulator 20 over the entire periphery of the electric wire conductor 10 or 10A by extrusion or the like.

By installing a roller device to form an electric wire conductor 10 or 10A and an extrusion device to extrude an insulator 20 continuously, it is possible to: perform the process from forming an electric wire conductor 10 or 10A by compressing a raw wire strand 10' to manufacturing a covered electric wire 30 continuously; and improve productivity. Further, all processes of manufacturing elemental wires 1 constituting a raw wire strand 10', twisting the elemental wires 1 together, deforming the raw wire strand 10' obtained by twisting together, and extruding an insulator 20 are processes that can be applied continuously to respective parts of a long material and high productivity can be attained by performing those processes continuously.

A covered electric wire 30: may be used alone in the state of covering the outer periphery of a single electric wire conductor 10 or 10A with an insulator 20; or may be used in the state of a wire harness in which a plurality of covered electric wires 30 are combined integrally with a coating material or the like or a connecting member such as a connector is attached to an end. The case of using a covered electric wire 30 in the form of a wire harness is explained hereunder.

<Wire Harness>

A wire harness according to an embodiment of the present disclosure is configured so as to have a connecting member such as a connector at an end of a covered electric wire 30 according to an embodiment of the present disclosure having an electric wire conductor 10 of a sector-shaped cross-sect ion or an electric wire conductor 10A of a flat cross-section. Otherwise, a wire harness according to the present embodiment is configured by bundling a plurality of covered electric wires, and at least some of the multiple covered electric wires comprise covered electric wires 30 according to an embodiment of the present disclosure each of which has an electric wire conductor 10 of a sector-shaped cross-section or an electric wire conductor 10A of a flat cross-section. A connecting member such as a connector is attached appropriately to an end of the each of the covered electric wires 30. On this occasion, the wire harness may be configured either by using only covered electric wires 30 each of which has an electric wire conductor 10 or 10A of a sector-shaped or flat cross-section as stated above or by using both a covered electric wire 30 of a sector-shaped or flat cross-section and another kind of a covered electric wire such as a general covered electric wire 30' having a circular electric wire conductor 10'. Further, when a wire harness is configured by using a plurality of covered electric wires 30 each of which has an electric wire conductor 10 or 10A of a sector-shaped or flat cross-section according to the present disclosure, the material qualities, shapes, dimensions, etc. of the electric wire conductors 10 or 10A, and the insulators 20 constituting the multiple covered electric wires 30 may be identical to each other or different from each other.

A wire harness according to the present embodiment is excellent in space saving and flexibility and hence excellent in cable routing. As a result, it is easy to secure a sufficient routing space and hence a conductor cross-sectional area can be increased, and the wire harness can be used suitably as a power line of an electric vehicle or the like, for example. When a power line is configured by using a wire harness according to the present embodiment in particular, since an electric wire conductor 10 or 10A comprises an aggregate of fine elemental wires 1, the electric wire conductor 10 or 10A as a whole has high resistance to bending and vibration. As a result, fatigue failure caused by engine vibration or the like is less likely to occur.

Figure 6B:
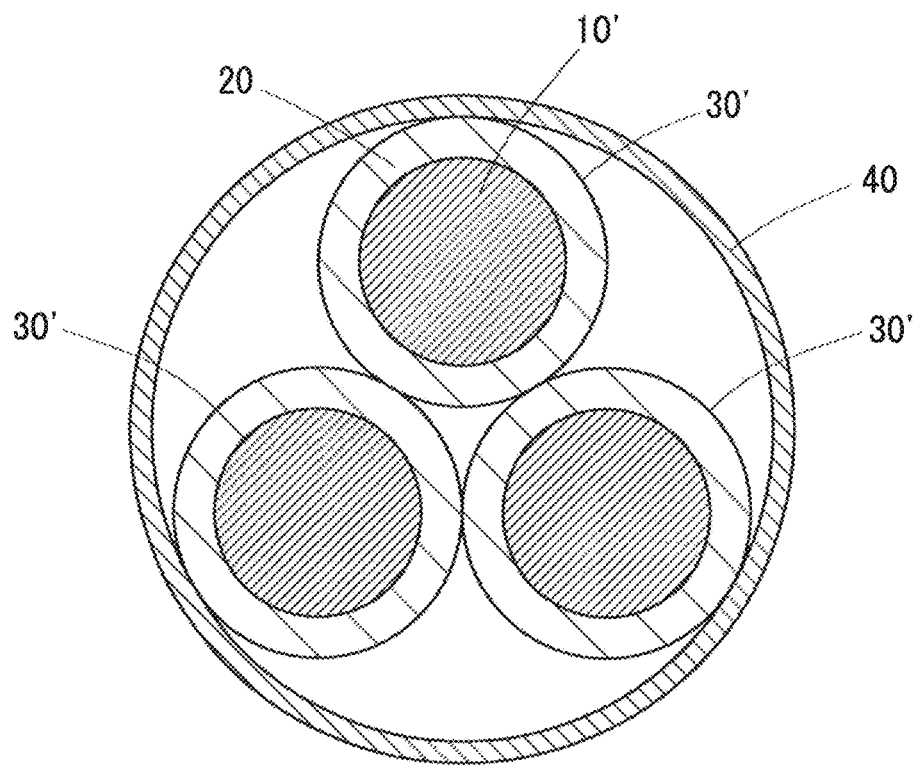

Since a conventional wire harness configured by bundling general covered electric wires 30' is bulky as a whole, if it is tried to secure a routing space of the wire harness in an automobile, a living space (a space where a passenger can stay) becomes narrow in some cases. For example, when an aggregate of multiple covered electric wires is accommodated in a hollow cylindrical housing member 40 such as a pipe shield or a corrugated tube and routed, the volume occupied by the aggregate of the multiple covered electric wires increases and, in accordance with that, it becomes necessary to use a housing member 40 of a large diameter. As a specific example of the housing member 40, a pipe shield to accommodate multiple covered electric wires inside can be exemplified in a wire harness placed under the floor of an automobile. If conventional general multiple covered electric wires 30' having conductors of a circular cross-section are integrated and accommodated inside a housing member 40 such as a pipe shield, an excessive space is generated in the interior of the housing member 40 as shown in FIG. 6B and a housing member 40 of a large diameter has to be used.

On the contrary, it is possible, however, to secure a wide living space by using a covered electric wire 30 having an electric wire conductor 10 of a sector-shaped cross-section or an electric wire conductor 10A of a flat cross-section as stated above and keeping the space required for routing a wire harness small. This is because a space occupied by the aggregate of covered electric wires 30 can be kept small by using the shapes of the covered electric wires 30 reflecting the cross-sectional shapes of the electric wire conductors 10 or 10A. For example, a housing member of a small diameter can be used as a housing member 40 such as a pipe shield or a corrugated tube accommodating the aggregate of the covered electric wires 30. Specific examples of a wire harness having a housing member 40 are explained hereunder in the case of using an electric wire conductor 10 of a sector-shaped cross-section according to a first embodiment and the case of using an electric wire conductor 10A of a flat cross-section according to a second embodiment, respectively.

(1) First Embodiment

Firstly, a form of constituting a wire harness by using a covered electric wire 30 having an electric wire conductor 10 of a sector-shaped cross-section according to the first embodiment of the present disclosure is exemplified. When a plurality of covered electric wires 30 are combined integrally with a housing member 40 such as a pipe and used, by placing the multiple covered electric wires 30 each of which has a semicircular or sector-shaped cross-section so that the side parts of the semicircular or sector shape may be adjacent to each other, and the curved parts may form a circle continuously as shown in FIG. 4A, the area of the circular cross-section can be filled with the covered electric wires 30 without a gap. Consequently, that means that a housing member 40 having a diameter capable of accommodating the area of the circular cross-section should be used as a housing member 40 and hence the diameter of the housing member 40 can be smaller than the case of bundling covered electric wires 30' each of which has an electric wire conductor 10' of a circular cross-section. For example, a plurality of covered electric wires 30 can be placed in a housing member 40 such as a pipe shield without a gap as shown in FIG. 4A.

Further, when a heat dissipation sheet 50 is interposed between covered electric wires 30, heat dissipation improves. When electric wire conductors 10 of a sector-shaped cross-section are used, heat becomes less likely to be dissipated at the opposing side parts than at the curved parts and the like exposed to the outside because the distance between the covered electric wires 30 reduces. By interposing a heat dissipation sheet 50 between the side parts, however, it is possible to inhibit the influence of heat generation during energization even when multiple covered electric wires 30 are bundled with a pipe or the like and placed. On this occasion, if covered electric wires 30 are bundled by using a pipe or the like of high thermal conductivity like an aluminum pipe as a housing member 40 for example, heat can be dissipated from both the side parts and the curved parts.

(2) Second Embodiment

Successively, a form of constituting a wire harness by using a covered electric wire 30 having an electric wire conductor 10A according to the second embodiment of the present disclosure is exemplified. In this form, many covered electric wires 30 can be arranged in a width direction (direction along a width W) or in a height direction (direction along a height H) by utilizing that each of the covered electric wires 30 has a flat cross-section. The multiple covered electric wires 30 may also be arranged in both the width and height directions in a matrix. The multiple covered electric wires 30 can be arranged in an orderly manner and with gaps formed between them reduced by using the flat shape, and the wire harness becomes excellent in space saving. Further, by selecting parameters on the arrangement of covered electric wires such as the number of the covered electric wires 30 arranged in the width direction, the number of the covered electric wires 30 stacked in the height direction, and the like, it is possible to integrate the group of the covered electric wires 30 in various mutual arrangements. By setting the mutual arrangements of the covered electric wires 30 in accordance with the shape and size of a space for routing, it is possible to route a wire harness by using various spaces. For example, by arranging covered electric wires 30 side by side in a width direction, it is possible to route a wire harness along a flat surface and a curved surface with the overall height kept small. Further, by stacking covered electric wires 30 in a height direction, it is possible to accommodate a wire harness in a long and narrow space.

When a wire harness is configured by using covered electric wires 30 each of which has an electric wire conductor 10A of a rectangular cross-section as shown in FIG. 3A in particular, by arranging the covered electric wires 30 so that the sides (short sides and/or long sides) of the rectangular shape may be adjacent to each other in parallel, it is possible to arrange the covered electric wires 30 particularly orderly and keep gaps between the covered electric wires 30 particularly small. On this occasion, therefore, a wire harness of very high space saving is obtained. On this occasion, however, since heat dissipation is likely to deteriorate because the gaps between adjacent covered electric wires 30 reduce or disappear, it is desirable to interpose a heat dissipation sheet 50 between the adjacent covered electric wires 30.

Figure 4B:
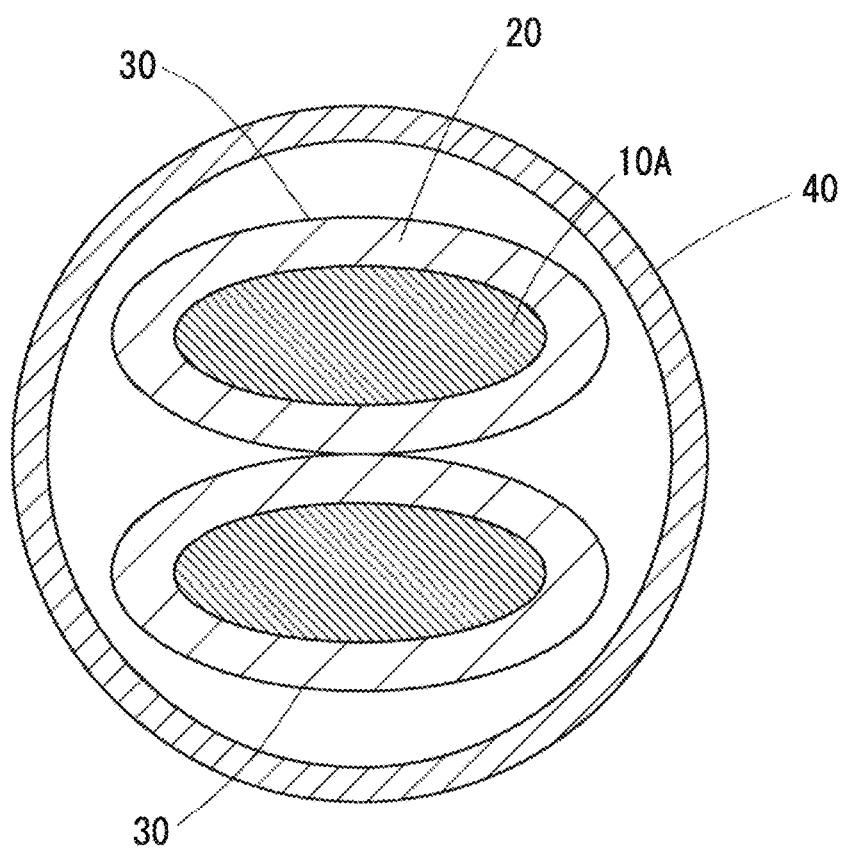

On the other hand, when edges extending in a width direction have outwardly-curved shapes in an elliptic cross-section of an electric wire conductor 10A shown in FIG. 3B or the like, both space saving and heat dissipation are easy to be obtained by configuring a wire harness with covered electric wires 30 each of which has such an electric wire conductor 10A. In other words, because each of the covered electric wires 30 has a flat cross-section that is long in the width direction, when the multiple covered electric wires 30 are arranged along the width direction or the height direction as stated above, a high degree of space saving is obtained. Meanwhile, because edges (edges in the width direction) occupying most of the outer edges and extending in the width direction do not have straight lines like the rectangular cross-section but have outwardly-curved shapes in the cross-section of an electric wire conductor 10A, even when a plurality of covered electric wires 30 are arranged along the height direction as shown in FIG. 4B, a contact site between adjacent covered wires electric 30 is limited to the most outward protruding site of the edges in the width direction. In the area other than the site, in other words in in the area occupying most parts of the outer edges in the cross-section of the covered electric wires 30, the adjacent covered electric wires 30 are retained in the state of not touching each other and separating from each other. As a result, high heat dissipation is secured at the site between the covered electric wires 30.

On this occasion, it is unnecessary to interpose a heat dissipation sheet 50 between adjacent covered electric wires 30 with the aim of dissipating heat from the site between the covered electric wires 30. It is acceptable to configure a wire harness by arranging a plurality of covered electric wires 30 in the height direction without interposing a heat dissipation sheet 50 and accommodating the covered electric wires 30 in a housing member 40 such as a corrugated tube appropriately as shown in FIG. 4B. By not using a heat dissipation sheet 50, it is possible to reduce the number of constituent members of a wire harness and simplify the wire harness.

Further, a covered electric wire 30 having an electric wire conductor 10A having a cross-sectional shape whose edges extending in a width direction form outward curves such as an elliptic shape is advantageous even in the event of attaching another member to an end when a wire harness is configured. This is because another member is easier to be placed closely along an outer periphery of the covered electric wire 30 in the case where the external shape of the cross-section of the covered electric wire 30 has a gentle shape including outward curves like an elliptic shape than in the case where the external shape of the cross-section of the covered electric wire 30 has a linear shape, namely a shape including straight lines and corners, like a rectangular shape.

Figure 5A:
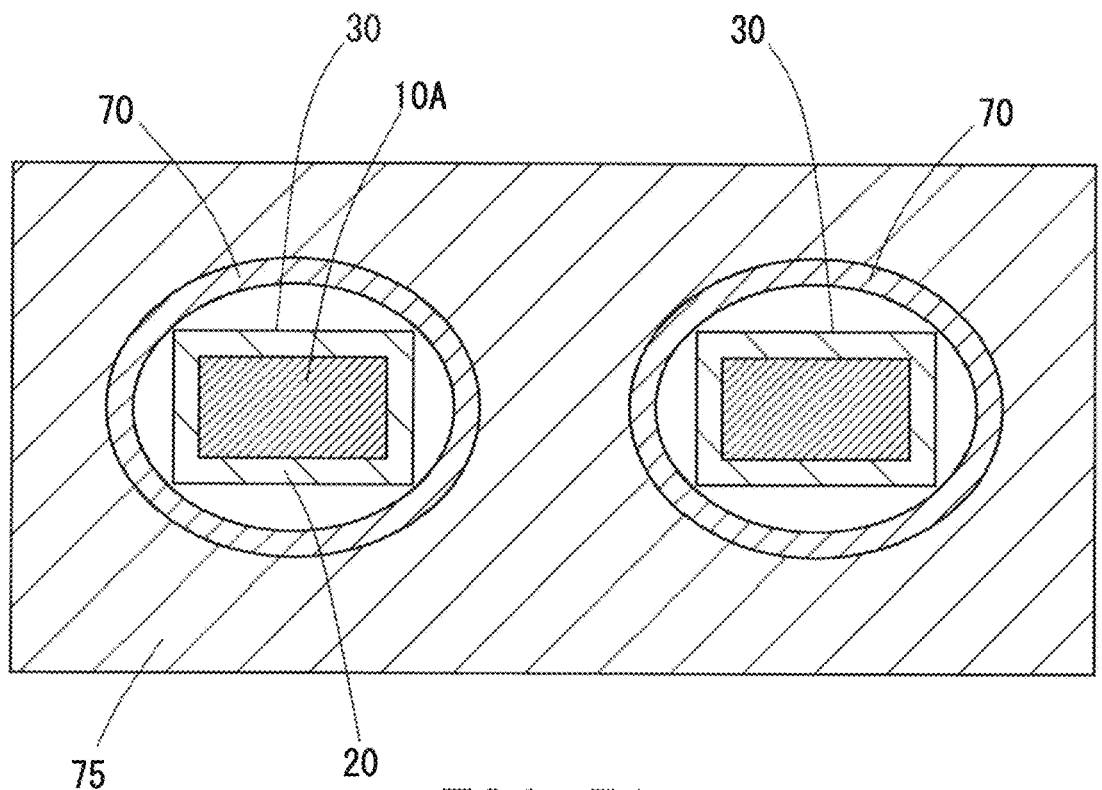
Figure 5B:
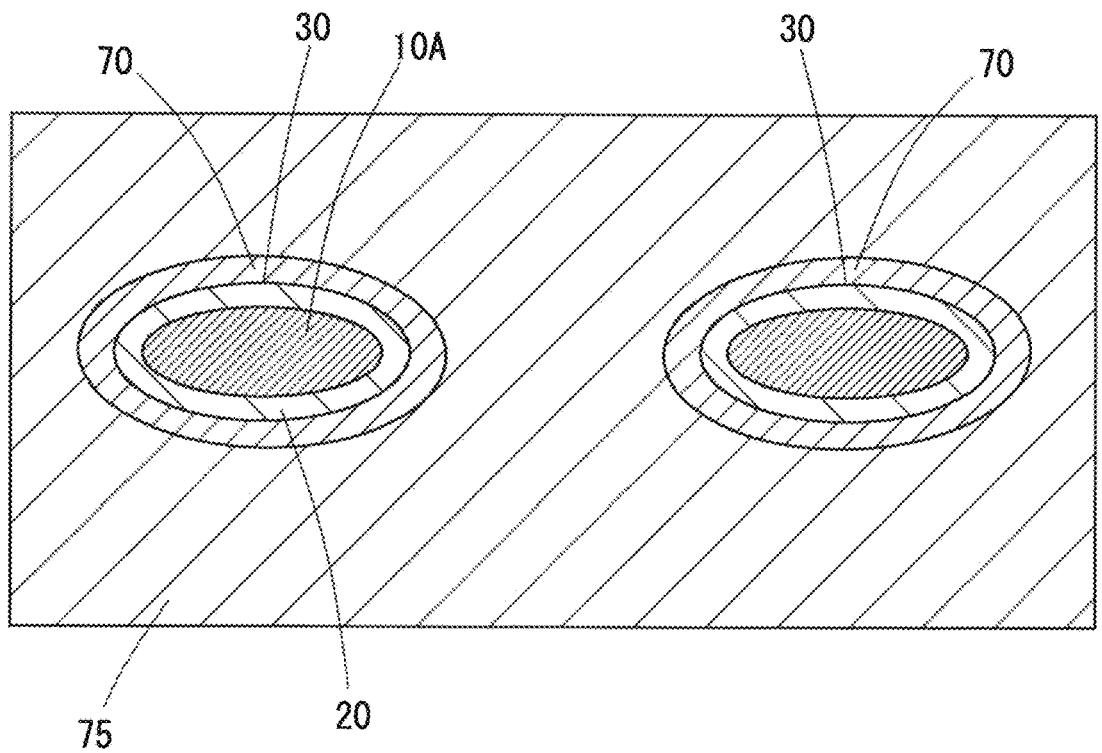

As shown in FIGS. 5A and 5B for example, the following case is considered: placing a hollow cylindrical stopcock 70 comprising a rubber material at an outer periphery of an end of a covered electric wire 30; and then accommodating the stopcock 70 in a connector housing 75. The stopcock 70 plays the role of stopping water between the covered electric wire 30 and the connector housing 75. In the case of using an electric wire conductor 10A of a rectangular cross-section like FIG. 5A, the cross-sectional shape of the covered electric wire 30 is also rectangular and, when an outer periphery of the covered electric wire 30 is covered with the stopcock 70, it is difficult to make an inner peripheral surface of the stopcock 70 follow straight sides and corners of the rectangular shape. For example, the stopcock 70 becomes in the state of being locked at the parts corresponding to the corners of the rectangular shape and in the state of floating up outside the covered electric wire 30 at the side parts of the rectangular shape. Consequently, a vacant space is formed between the side parts of the rectangular shape and the stopcock 70. The vacant space can be a channel for water to intrude into the connector housing 75 from the outside, and there may be a case where the stopcock 70 does not exhibit sufficient water stopping performance.

On the other hand, in the case of using an electric wire conductor 10A whose cross-section has edges comprising outward curves and extending in a width direction like an elliptic shape as shown in FIG. 5B, the edges extending in the width direction of a covered electric wire 30 can also comprise outward curves. When an outer periphery of the covered electric wire 30 is covered with a stopcock 70, the inner peripheral surface of the stopcock 70 is likely to be in the state of following the curved shapes at the outer periphery of the covered electric wire 30 corresponding to the edges having the outwardly-curved shapes and extending in the width direction and in close contact to the outer peripheral surface of the covered electric wire 30. In the case where the electric wire conductor 10A has an elliptic cross-section in particular, the entire outer periphery of the cross-section of the covered electric wire 30 becomes a smooth outwardly-curved shape and hence the whole inner peripheral surface of a stopcock 70 is likely to be in the state of following and in close contact to the outer peripheral surface of the covered electric wire 30. Because the stopcock 70 is in close contact to the outer periphery of the covered electric wire 30 without interposing a space in between, water becomes less likely to intrude between the stopcock 70, and the covered electric wire 30 and high water stopping performance is obtained between the covered electric wire 30 and a connector housing 75.

Examples

Examples are shown hereunder. It should be noted, however, that the present invention is not limited by these examples.

(1) Case where an Electric Wire Conductor has a Sector-Shaped Cross-Section

In a cross-section of an electric wire conductor formed into a sector-shaped cross-section, the deformation state of elemental wires and the state of a vacant space are examined.

(Test Method)

A raw wire strand having a conductor cross-sectional area of 60 mm² and a substantially circular cross-section is manufactured by twisting 741 aluminum alloy wires 0.32 mm in outer diameter together. The cross-sectional area of the raw wire strand was about 78.5 mm² when the vacant space among elemental wires was included.

An electric wire conductor of a sector-shaped cross-section was manufactured by applying compression processing to the raw wire strand with rollers. Compression by rollers was performed by applying force from top and bottom with a roller having an arc-shaped groove part and a roller having a V-shaped groove part. On this occasion, the cross-sectional area of the groove parts was changed, and the force applied to the raw wire strand was also changed. A product obtained by being compressed with rollers having groove parts the cross-sectional area of which is 85% of the original raw wire strand is defined as Sample A1 and a product obtained by being compressed with rollers of 80% is defined as Sample A2. That is, Sample A2 of the smaller groove part cross-sectional area is in the state of a high compression rate where a stronger force is applied. Successively, an insulator 1.5 mm in thickness comprising PVC was applied to the outer periphery of each of the electric wire conductors.

Across-sectional sample was prepared by embedding each of Sample A1 and Sample A2 into an epoxy resin and polishing a cross-section intersecting an axial direction. Then, the obtained cross-sectional samples were photographed.

Image analysis was applied to a photograph taken from each of the cross-sections and a deformation ratio of an elemental wire was evaluated. On this occasion, a deformation ratio of an elemental wire was calculated as a deformation ratio D through the following expression (1) by defining a length of the longest straight line laterally crossing a cross-section as a long diameter A and a diameter of an elemental wire before deformed as a circle diameter R:

$$D=(A-R)/R\times 100\% \quad (1).$$

As the circle diameter R, 0.32 mm that is the outer diameter of an elemental wire in a raw wire strand before deformed is adopted. Further, a deformation ratio of elemental wires is estimated for the elemental wires included in the outer peripheral part shown as the square region R1 and likewise the center part shown as the square region R2 in each of FIGS. 9B and 9C and an average value of deformation ratios in each region is calculated. Further, as a proportion of a deformation ratio at an outer peripheral part to a deformation ratio at a center part, an outer periphery deformation ratio proportion is calculated (outer periphery deformation ratio proportion=outer peripheral part deformation ratio/center part deformation ratio×100%).

Further, a circular elemental wire proportion was estimated as a proportion of the number of elemental wires of circular cross-sections to the total number of elemental wires by regarding elemental wires having deformation ratios of 5% or lower as elemental wires of circular cross-sections (circular elemental wire proportion=number of elemental wires of circular cross-sections/total number of elemental wires×100%).

Further, a vacancy ratio is evaluated by image analysis. On this occasion, an entire cross-sectional area (A0) of an electric wire conductor is estimated as an area of a region inside a contour line that is formed by connecting contours of elemental wires located at the outermost periphery of the electric wire conductor, an area (A1) of a vacant space is estimated as an area of a region that is not occupied by the elemental wires in the region stated above, and a vacancy ratio is calculated (A1/A0×100%).

(Test Results)

Figure 9A:
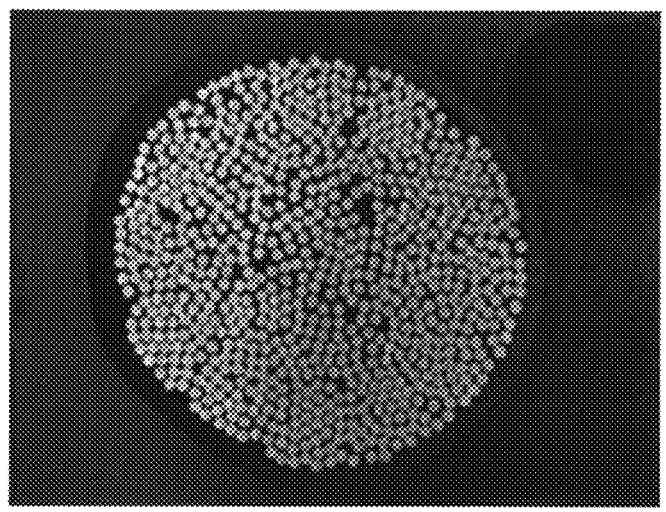
FIGS. 9A to 9C are photographs of cross-sections of covered electric wires when the cross-sections of electric wire conductors are deformed into sector shapes.
Figure 9B:
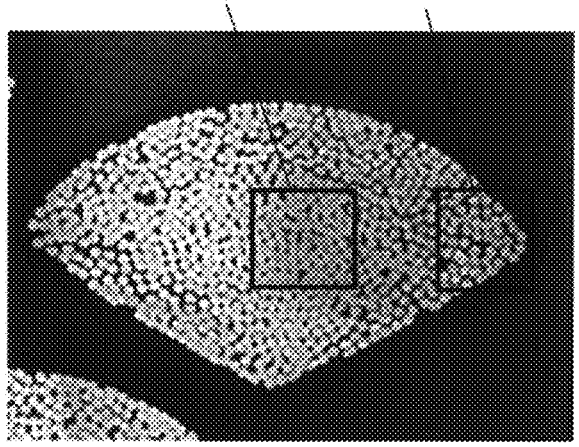
Figure 9C:
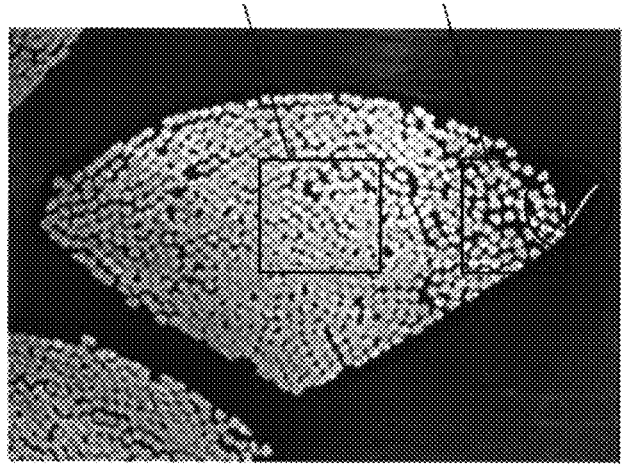

Photographs of the cross-sections of covered electric wires are shown in FIGS. 9A to 9C. FIG. 9A corresponds to a raw wire strand before compression, FIG. 9B corresponds to Sample A1 of the low compression rate, and FIG. 9C corresponds to Sample A2 of the high compression rate. Further, the values of the deformation ratios of elemental wires, circular elemental wire proportions, and the vacancy ratios obtained through image analysis of Sample A1 and Sample A2 are summarized in Table 1 below. Here, a cross-sectional area ratio in Table 1 is a percentage of a cross-sectional area of groove parts formed in rollers to a cross-sectional area (78.5 mm²) of a raw wire strand before compression.

TABLE 1

| | Sector-shaped cross-section | | | | | |
|---|---|---|---|---|---|---|
| | | Deformation ratio of elemental wires | | | | |
| | Cross-sectional area ratio | Outer peripheral part | Center part | Outer periphery deformation ratio | Circular elemental wire proportion | Vacancy ratio |
| Sample A1 | 85% | 2.6% | 18% | 14% | 20% | 16% |
| Sample A2 | 80% | 28% | 17% | 165% | 8% | 17% |

When comparing the cross-sectional photographs of Sample A1 in FIG. 9B and Sample A2 in FIG. 9C, whereas the cross-sections of the elemental wires in Sample A1 do not significantly deform from substantially circles before processing in FIG. 9A, many elemental wires deforming significantly from a circle are seen in Sample A2. When focusing on a corner part where a side and a curved line of a sector shape touch each other in particular, whereas the outer peripheral part is formed smoothly in Sample A1, sharp burrs are generated undesirably as shown in the state of being enclosed by the circle in Sample A2. Here, the corner part tends to have a relatively low deformation ratio at the outer peripheral part when compression is applied so that the deformation ratio of the outer peripheral part may be small like Sample A1 but, in Sample A2, since compression is applied at a high compression rate with a roller having an arc-shaped groove part and a roller having a V-shaped groove part, a sharply protruding burr structure is formed at the corner part that is the contact point of the rollers.

These tendencies seen in the photographs appear also in the image analysis results in Table 1. The deformation ratios of elemental wires at the center parts of the electric wire conductors are similar between Sample A1 and Sample A2. The deformation ratios at the outer peripheral parts, however, are significantly different between Sample A1 and Sample A2. In Sample A1, the deformation ratio at the outer peripheral part is as small as 2.6%, and the deformation ratio proportion to the deformation ratio at the center part is 14%.

In Sample A2 in contrast, the deformation ratio at the outer peripheral part is 2.8%. This is a value larger than the deformation ratio at the center part and is 1.65 times the deformation ratio at the center part. The value of 28% of the deformation ratio at the outer peripheral part includes also the deformation ratio of burrs shown in the state of being enclosed by the circle in FIG. 9C but, even if the elemental wires are disregarded, the deformation ratio at the outer peripheral part in Sample A2 is 17% and is considerably higher than the deformation ratio in Sample A1. Further, with regard to circular elemental wire proportions, whereas the value is 20% in Sample A1, the value is only 8% in Sample A2.

Meanwhile, the cross-sectional area ratio of the groove parts of the rollers is lower in Sample A2 than in Sample A1 and compression is applied at a high pressure in Sample A2 but the vacancy ratio of Sample A2 is higher than the vacancy ratio of Sample A1 in Table 1. This means that Sample A2 is not tightened by a coating material because Sample A2 includes burrs, the electric wire conductor is untied after the compression, and hence the apparent vacancy ratio increases in Sample A2.

Further, as it is obvious from the cross-sectional photographs in FIGS. 9B and 9C, Sample A1 and Sample A2 are compressed so that sufficient vacant spaces may remain among the elemental wires and hence are excellent in flexibility.

(2) Case where an Electric Wire Conductor has a Flat Cross-Section

The deformation state of elemental wires was examined also in a cross-section of an electric wire conductor formed into a flat cross-section and flexibility was evaluated.

(Test Method)

Evaluation of deformation state of elemental wires in cross-section

A raw wire strand having a conductor cross-sectional area of 15 mm$^2$ and a substantially circular cross-section was manufactured by twisting 171 aluminum alloy wires 0.32 mm in outer diameter together. Further, a raw wire strand having a conductor cross-sectional area of 60 mm$^2$ and a substantially circular cross-section was manufactured by twisting 741 same aluminum alloy wires together. The raw wire strand is the same as the raw wire strand used in Test (1) stated above.

Electric wire conductors with rectangular cross-sections were manufactured by applying compression processing to the two types of raw wire strands stated above with rollers. Compression by rollers was performed by applying forces F1 and F2 from top and bottom at first, successively applying forces F1' and F2' from the same directions again, and simultaneously applying forces F3 and F4 from both sides in the width direction. On this occasion, electric wire conductors of different compression rates were manufactured by applying forces of different magnitudes. In the case of the conductor cross-sectional area of 15 mm$^2$, Sample B1 was manufactured as an electric wire conductor of a low compression rate and Sample B2 is manufactured as an electric wire conductor of a high compression rate. In the case of the conductor cross-sectional area of 60 mm$^2$, Sample C1 was manufactured as an electric wire conductor of a low compression rate and Sample C2 is manufactured as an electric wire conductor of a high compression rate. After the electric wire conductors were manufactured, the outer periphery of each of the electric wire conductors was covered with an insulator 1.5 mm in thickness comprising PVC.

For each of the samples, a cross-sectional sample was created and photographed similarly to the above Test (1). Then the obtained cross-sectional photograph is analyzed and respective average values of deformation ratios of elemental wires at an outer peripheral part and a center part are estimated. The regions R1 and R2 used for the estimation of deformation ratios at respective regions are shown in FIGS. 10B, 10C, 11B, and 11C. In addition, a circular elemental wire proportion in a cross-section of each of the samples is estimated.

Evaluation of Flexibility

Figure 12:
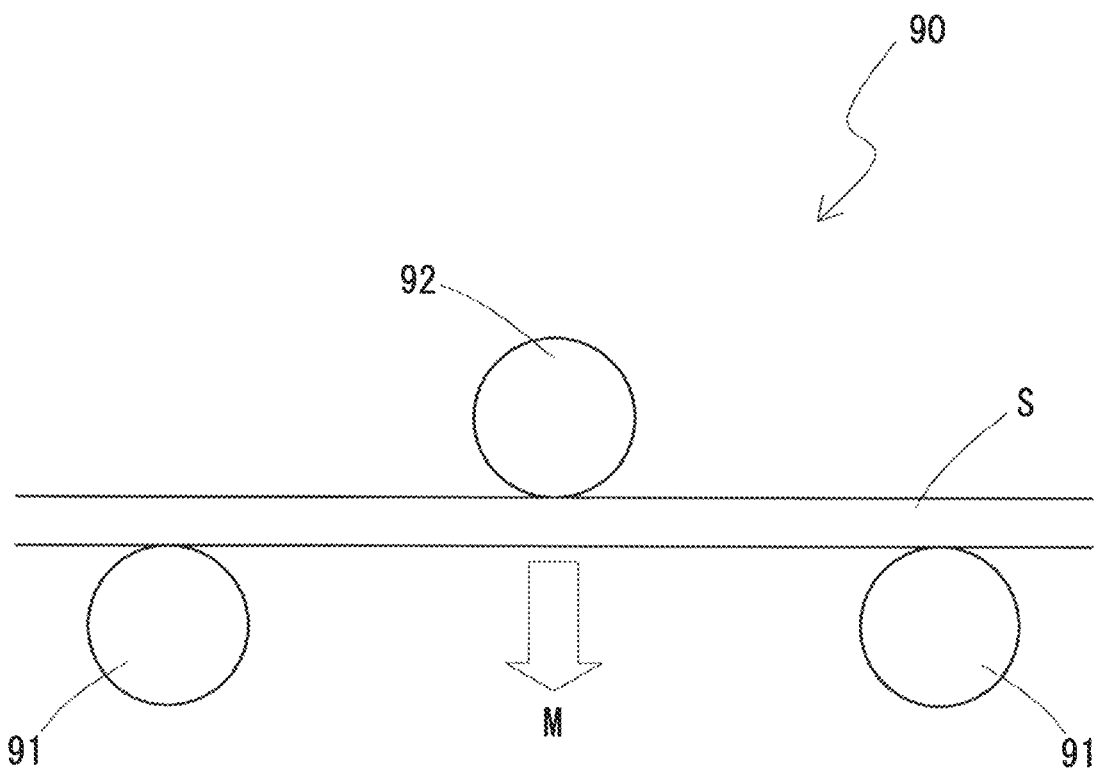
FIG. 12 is a side view explaining three-point bending test.

Flexibility of each of the samples was evaluated by three-point bending test. The three-point bending test was performed in accordance with JIS K7171:2016 with a test apparatus 90 shown in FIG. 12. Specifically, a pair of support parts 91, 91 having a cylindrical shape with a diameter of 10 mm was placed 40 mm apart from each other and a sample electric wire S was bridged and supported between the support parts 91, 91. Further, a load application part 92 was placed at a place in the middle of the paired support parts 91, 91 with the sample electric wire S interposed. The load application part 92 also has a cylindrical shape with a diameter of 10 mm similarly to the support parts 91, 91. The sample electric wire S was bent by moving the load application part 92 toward the site where the support parts 91, 91 were placed (movement M). The moving speed of the load application part 92 was set to 20 mm/min. While the sample electric wire S was bent, a load applied to the sample electric wire S was measured by a load cell and a maximum value of the load is recorded.

(Test Results)

Figure 10A:
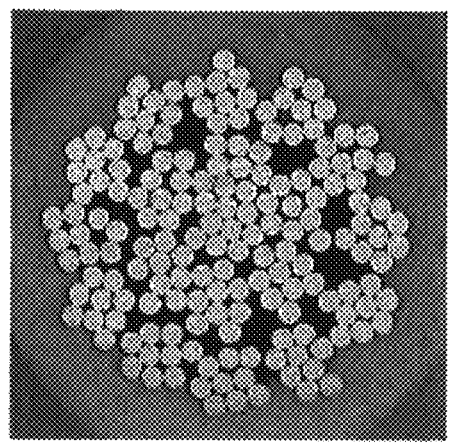
FIGS. 10A to 10C are photographs of cross-sections of covered electric wires when the cross-sections of electric wire conductors having a conductor cross-sectional area of 15 mm$^2$ are deformed into flat shapes.
Figure 10B:
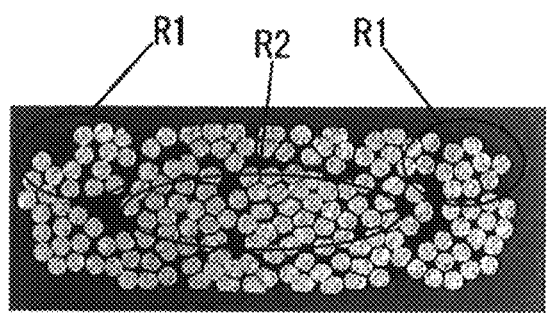
Figure 10C:
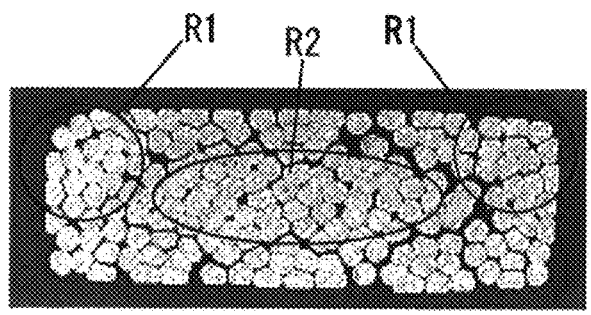
Figure 11A:
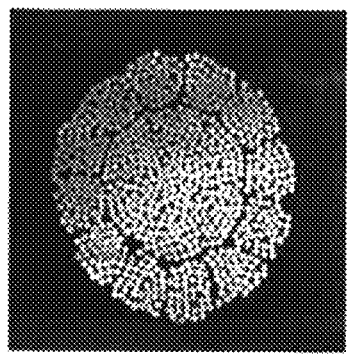
FIGS. 11A to 11C are photographs of cross-sections of covered electric wires when the cross-sections of electric wire conductors having a conductor cross-sectional area of 60 mm$^2$ are deformed into flat shapes.
Figure 11B:
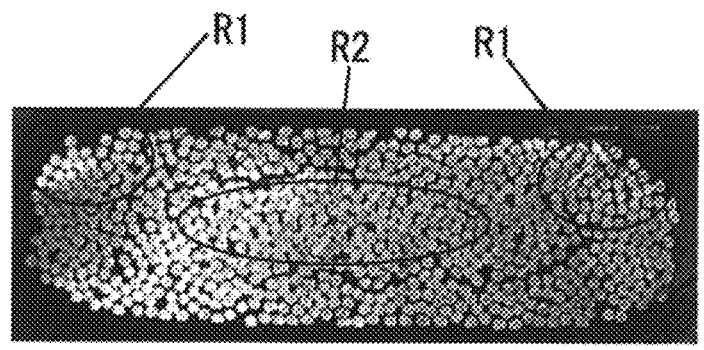
Figure 11C:
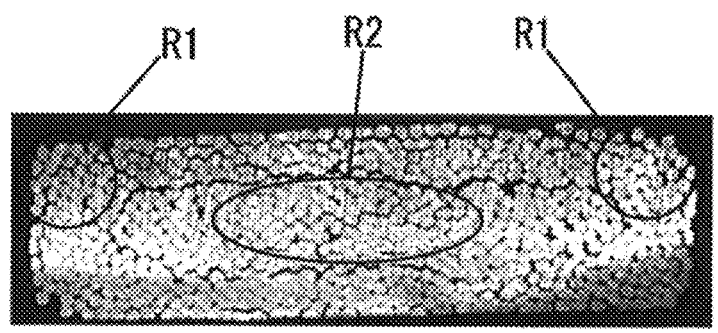

Photographs of the cross-sections of the covered electric wires having a conductor cross-sectional area of 15 mm$^2$ are shown in FIGS. 10A to 10C. FIG. 10A corresponds to a raw wire strand before compression, FIG. 10B corresponds to Sample B1 of the low compression rate, and FIG. 10C corresponds to Sample B2 of the high compression rate. Further, photographs of the cross-sections of the covered electric wires having a conductor cross-sectional area of 60 mm$^2$ are shown in FIGS. 11A to 11C. FIG. 11A corresponds to a raw wire strand before compression, FIG. 11B corresponds to Sample C1 of the low compression rate, and FIG. 11C corresponds to Sample C2 of the high compression rate. Further, the values of the deformation ratios of elemental wires and circular elemental wire proportions obtained by image analysis, and the maximum loads obtained by the three-point bending test of Samples B1 and B2 and Samples C1 and C2 are summarized in Table 2 and Table 3 below, respectively. In the tables, cross-sectional dimensions measured actually from the cross-sectional photographs and compression rates (percentages of cross-sectional areas reduced by compression) calculated from ratios of the cross-sectional areas of spaces between rollers, and the cross-sectional areas of raw wire strands are also shown collectively.

TABLE 2

Flat cross-section (15 mm$^2$)

|  | Dimension | Compression rate | Deformation ratio of elemental wires | | | Circular elemental wire proportion | 3-point bending maximum load |
|---|---|---|---|---|---|---|---|
|  |  |  | Outer peripheral part | Center part | Outer periphery deformation ratio |  |  |
| Before compression | Diameter 5.3 mm | — | 0% | 0% | — | 100% | 14N |
| Sample B1 | 2.2 mm × 8.9 mm | 10% | 1.9% | 16% | 12% | 51% | 14N |
| Sample B2 | 2.0 mm × 7.0 mm | 30% | 32% | 14% | 227% | 4% | 16N |

TABLE 3

Flat cross-section (60 mm$^2$)

|  | Dimension | Compression rate | Deformation ratio of elemental wires | | | Circular elemental wire proportion | 3-point bending maximum load |
|---|---|---|---|---|---|---|---|
|  |  |  | Outer peripheral part | Center part | Outer periphery deformation ratio |  |  |
| Before compression | Diameter 11 mm | — | 0% | 0% | — | 100% | 75N |
| Sample C1 | 4.7 mm × 18.7 mm | 10% | 1.9% | 38% | 4.9% | 50% | 76N |
| Sample C2 | 4.1 mm × 16.5 mm | 30% | 35% | 49% | 71% | 2% | 88N |

As a result of comparing the cross-sectional photographs of Sample B1 in FIG. 10B and Sample B2 in FIG. 10C, whereas the cross-sections of respective elemental wires in Sample B1 are not significantly deformed from a substantially circle before processed in FIG. 10A, many elemental wires significantly deformed from a circle are seen in Sample B2. In addition, whereas large voids remain among elemental wires in Sample B1, the voids among elemental wires are small in Sample B2. In comparison between the cross-sectional photographs of Sample C1 in FIG. 11B and Sample C2 in FIG. 11C too, the same trends as stated above are seen.

These tendencies seen in the photographs appear also in the image analysis results in Tables 2 and 3. Firstly, when the case of a conductor cross-sectional area of 15 mm$^2$ in Table 2 is examined, with regard to a deformation ratio of elemental wires, the deformation ratios of electric wire conductors at the center parts are about the same between Sample B1 and Sample B2. The deformation ratios at the outer peripheral parts, however, are different significantly between Sample B1 and Sample B2. The deformation ratio at the outer peripheral part, however, is as small as 1.9%, and the deformation ratio proportion to the deformation ratio at the center part is 12% in Sample B1. In contrast, the deformation ratio at the outer peripheral part is 32% in Sample B2. This figure is higher than the deformation ratio at the center part and is 2.3 times the deformation ratio at the center part.

With regard to the circular elemental wire proportion, whereas the figure is 51% in Sample B1, the figure is only 4% in Sample B2.

Successively, when the case of a conductor cross-sectional area of 60 mm$^2$ in Table 3 is examined, the deformation ratio of elemental wires is 38% at the center part but is 1.9% at the outer peripheral part in Sample C1. In other words, the deformation ratio at the outer peripheral part is significantly lower than the deformation ratio at the center part. The deformation ratio proportion at the outer peripheral part to the deformation ratio at the center part is 4.9%. In contrast, the deformation ratio at the center part is 49% but the deformation ratio at the outer peripheral part is 35% in Sample C2. That is, the deformation ratio of elemental wires is lower at the outer peripheral part than at the center part in Sample C2 of the high compression rate too, similarly to Sample C1 of the low compression rate. This is different from the fact that the deformation ratio of elemental wires is higher at the outer peripheral part than at the center part in Sample B2 of the high compression rate in Table 2. In Sample C2, however, the deformation ratio proportion, which is the proportion of the deformation ratio at the outer peripheral part to the deformation ratio at the center part, is 71%. This figure is significantly higher than the deformation ratio of 4.9% in Sample C1 of the low compression rate. A circular elemental wire proportion is 50% in Sample C1 but only 2% in Sample C2.

From the above, in the flat samples of either conductor cross-sectional area, whereas the deformation ratios of elemental wires at the outer peripheral parts are 70% or lower of the deformation ratios of elemental wires at the center parts in the case of the low compression rate (Samples B1 and C1), the deformation ratios of elemental wires at the outer peripheral parts exceed 70% of the deformation ratios of elemental wires at the center parts in the case of the high compression rate (Samples B2 and C2). Further, in the samples of either conductor cross-sectional area, the circular elemental wire proportions reach 50% in the case of the low compression rate (Samples B1 and C1) but do not even reach 5% in the case of the high compression rate (Samples B2 and C2).

Further, attention is paid to the maximum load obtained through the three-point bending test in Tables 2 and 3. A higher maximum load value requires a larger load for bending a sample electric wire and indicates that the flexibility of the electric wire conductor is low. According to Table 2, the maximum load is 14 N in the state before compression, 14 N in Sample B1 of the low compression rate, and 16 N in Sample B2 of the high compression rate. That is, whereas the same flexibility as before compression is secured even after the electric wire conductor is compressed in Sample B1, the flexibility of the electric wire conductor deteriorates through compression in Sample B2.

According to Table 3, the maximum load values of the three-point bending increase in response to the larger conductor cross-sectional area than the case of Table 2. When the three-point bending loads are compared between the samples, however, the maximum load is 75 N in the state before compression, 76 N in Sample C1 of the low compression rate, and 88 N in Sample C2 of the high compression rate. That is, whereas almost the same flexibility as before compression is secured even after the electric wire conductor is compressed in Sample C1, the flexibility of the electric wire conductor deteriorates through compression in Sample C2.

From the above, the following can be found by combining the results of the deformation of elemental wires in a cross-section of a conductor and the flexibility evaluation by three-point bending in the test of the case of the flat cross-section. That is, when the compression rate of a conductor is lowered, the deformation ratio of elemental wires at an outer peripheral part can be 70% or lower of the deformation ratio of elemental wires at a center part, and the circular elemental wire proportion largely exceeds 5%. As a result, it is possible to secure almost the same flexibility as before compression. Generally, the maximum load by the three-point bending is within 98% or higher of the value obtained when an uncompressed electric wire conductor with the same conductor cross-sectional area is used. On the other hand, when the proportion of the deformation ratio of elemental wires at an outer peripheral part to the deformation ratio of elemental wires at a center part increases in excess of 70% or the circular elemental wire proportion is lower than 5% in a cross-section of an electric wire conductor by increasing a compression rate, it is difficult to secure sufficient flexibility in an electric wire conductor after compression.

The following can be shown from the above test results in the cases of the electric wire conductors having a sector-shaped cross-section and a flat cross-section. That is, by forming an electric wire conductor into a sector-shaped cross-sectional shape or a flat cross-sectional shape so that a deformation ratio at an outer peripheral part may be not more than a deformation ratio at a center part and further a deformation ratio at an outer peripheral part may be 70% or lower of a deformation ratio at a center part, it is possible to provide an electric wire conductor excellent in space saving and flexibility while excessive load is less likely to be applied to the elemental wires at an outer peripheral part and a defect such as a burr is not generated.

Although the embodiments according to the present invention have been explained above in detail, the present invention is not limited to the above embodiments at all and can be modified and changed variously within the range not deviating from the tenor of the present invention.

In the above, with the challenge of providing an electric wire conductor that is excellent in space saving and flexibility and is less likely to concentrate a load on specific elemental wires as well as a covered electric wire and a wire harness that comprise the electric wire conductor, an electric wire conductor comprising a wire strand formed by twisting a plurality of elemental wires together and having a deformed part whose cross-section is formed into a flat shape or a sector shape, in which a deformation ratio of the elemental wires from a circle at an outer peripheral part facing an outer periphery of the deformed part is 70% or lower of a deformation ratio at a center part located inside the outer peripheral part in the cross-section of the deformed part, has been explained in detail. The above challenge, however, can be solved even when a deformation ratio of elemental wires from a circle at an outer peripheral part of a deformed part is not related as stated above to a deformation ratio at a center part.

For example, an electric wire conductor comprising a wire strand formed by twisting a plurality of elemental wires together and having a deformed part whose cross-section is formed into a flat shape or a sector shape, in which a proportion of elemental wires having a circular cross-sectional shape is 10% or higher in the cross-section of the deformed part, is acceptable. Otherwise, an electric wire conductor comprising a wire strand formed by twisting a plurality of elemental wires together and having a deformed part whose cross-section is formed into a flat shape or a sector shape, in which a deformation ratio of elemental wires from a circle is 15% or lower at an outer peripheral part facing an outer periphery of the deformed part in the cross-section of the deformed part, is acceptable. To those two cases too, various configurations that have been explained above in detail can be applied as desirable configurations of an electric wire conductor, a covered electric wire, and a wire harness. Further, an electric wire conductor can be manufactured by the manufacturing method that has been explained above in detail.

Furthermore, the above challenge can be solved also when the cross-section of a deformed part has a shape other than a flat shape or a sector shape. That is, an electric wire conductor comprising a wire strand formed by twisting a plurality of elemental wires together and having a deformed part whose cross-section is anon-circle is acceptable as long as the deformed part has at least one of the following (1) to (3) configurations. Here, a non-circle refers to a shape other than a circle or a shape that can be approximated to a circle and, in addition to a flat shape and a sector shape, a polygon or a shape that can be approximated to a polygon can be exemplified.

(1) In a cross-section of a deformed part, a deformation ratio of elemental wires from a circle at an outer peripheral part facing an outer periphery of the deformed part is not higher than a deformation ratio at a center part located inside the outer peripheral part. Or further, a deformation ratio of elemental wires at an outer peripheral part is lower than a deformation ratio of elemental wires at a center part. Or furthermore, a deformation ratio of elemental wires at an outer peripheral part is 70% or lower of a deformation ratio of elemental wires at a center part.

(2) In a cross-section of a deformed part, a number ratio of elemental wires having a circular cross-section is 10% or higher.

(3) In a cross-section of a deformed part, a deformation ratio of elemental wires from a circle is 15% or lower at an outer peripheral part.

To those cases too, various configurations that have been explained above in detail can be applied as desirable configurations of an electric wire conductor, a covered electric wire, and a wire harness. Further, an electric wire conductor can be manufactured by the manufacturing method that has been explained above in detail.

Figure 13:
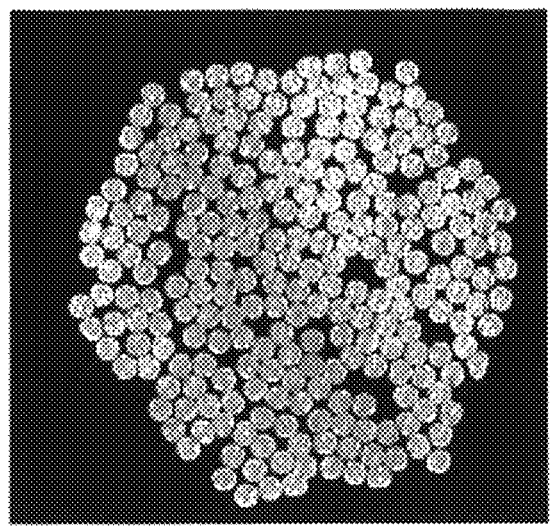
FIG. 13 is a photograph of a cross-section of an electric wire conductor when the cross-section of the electric wire conductor is deformed into a hexagonal shape.

As an example of an electric wire conductor in which a cross-sectional shape of a deformed part is a non-circle other than a flat shape and a sector shape, a cross-sectional photograph is shown in FIG. 13. Here, the cross-section of the electric wire conductor is formed into a hexagonal shape. In the photograph, the elemental wires at the outer peripheral part are hardly deformed from a circle, and the deformation ratio of the elemental wires at the outer peripheral part is not higher than the deformation ratio of the elemental wires at the center part like the above item (1). Further, it is obvious that the configurations of the above items (2) and (3) are also satisfied from the photograph. Here, the vacancy ratio is 24% in the cross-section.

REFERENCE SIGNS LIST 1 elemental wire
10, 10A electric wire conductor
10' raw wire strand (conventional general electric wire conductor)
20 insulator
30, 30' covered electric wire
40 housing member
50 heat dissipation sheet
(60a, 60b) roller
61 groove part
62 notch
63 clearance
70 stopcock
75 connector housing
90 test apparatus
91 support part
92 load application part
M movement during load application
S sample electric wire
H height of flat shape
W width of flat shape

The invention claimed is:

1. An electric wire conductor comprising:
a wire strand comprising:
a plurality of elemental wires twisted together; and
a deformed part in which a cross-section of the wire strand intersecting an axial direction of the wire strand is formed into a flat shape in which a width of the cross-section is larger than a height of the cross-section, and an entire outer periphery of the cross-section is formed as an outward curve,
the elemental wires having, in the cross-section of the deformed part, deformation ratios from a circle of 70% or lower at an outer peripheral part facing the outer periphery of the deformed part than at a center part located inside the outer peripheral part.

2. The electric wire conductor according to claim 1, wherein a number ratio of the elemental wires having circular cross-sections is 10% or higher in the cross-section of the deformed part.

3. The electric wire conductor according to claim 1, wherein the deformation ratios of the elemental wires from a circle are 15% or lower at the outer peripheral part in the cross-section of the deformed part.

4. The electric wire conductor according to claim 1, wherein the electric wire conductor has a vacancy ratio, which is a ratio of vacant spaces not occupied by the elemental wires, of 10% or higher in the cross-section in the deformed part.

5. The electric wire conductor according to claim 1, wherein the electric wire conductor has a continuous vacant space which can accommodate at least one of the elemental wires in the cross-section in the deformed part.

6. The electric wire conductor according to claim 1,
wherein the cross-section of the deformed part is formed into an elliptic shape.

7. The electric wire conductor according to claim 1, wherein the number of the elemental wires contained in the wire strand is 50 or larger.

8. The electric wire conductor according to claim 1, wherein at least some of the elemental wires comprise aluminum or an aluminum alloy.

9. A covered electric wire comprising:
the electric wire conductor according to claim 1; and
an insulator covering the outer periphery of the electric wire conductor.

10. A wire harness comprising:
the covered electric wire according to claim 9.

11. A wire harness comprising:
the covered electric wire according to claim 9; and
a plurality of the covered electric wires, placed with edges of the deformed parts extending in the width direction of adjacent electric wire conductors facing each other via the insulator in the cross-section.

12. The wire harness according to claim 11, wherein the wire harness comprises no heat dissipation sheet placed between the covered electric wires.

13. The wire harness according to claim 10,
wherein the electric wire conductor has the deformed part at a terminal end; and
the covered electric wire is accommodated in a connector housing in a state where a stopcock is placed at the outer periphery of the terminal end.

14. The wire harness according to claim 13,
wherein the stopcock is in close contact to the outer periphery of the covered electric wire without interposing a space in between.

15. A method for manufacturing an electric wire conductor to manufacture the electric wire conductor according to claim 1, the method comprising a compression step pressurizing a raw wire strand comprising elemental wires twisted together with rollers from a first direction and a second direction which intersect an axial direction of the raw wire strand and oppose each other.

16. The method for manufacturing the electric wire conductor according to claim 15,
wherein at least one of the rollers comprises a groove part touching the raw wire strand at least at a part in a circumferential direction,
wherein the at least one of the rollers comprising the groove part touches another roller at ends of the groove part, and comprises, at the ends of the groove part, notches to prevent the elemental wires constituting the raw wire strand from being caught between the rollers.

* * * * *